(12) United States Patent
Fukuda

(10) Patent No.: US 8,248,630 B2
(45) Date of Patent: Aug. 21, 2012

(54) MULTIFUNCTION MACHINE AND SYNCHRONIZATION SYSTEM

(75) Inventor: Takao Fukuda, Nara (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 896 days.

(21) Appl. No.: 12/318,833

(22) Filed: Jan. 9, 2009

(65) Prior Publication Data

US 2009/0180138 A1     Jul. 16, 2009

(30) Foreign Application Priority Data

Jan. 11, 2008  (JP) ................................ 2008-004811

(51) Int. Cl.
  *G06K 15/00* (2006.01)
  *G06F 3/12* (2006.01)
(52) U.S. Cl. ...................................... 358/1.14; 358/1.15
(58) Field of Classification Search .................... None
  See application file for complete search history.

(56) References Cited

U.S. PATENT DOCUMENTS

| | | | |
|---|---|---|---|
| 7,145,450 B2 * | 12/2006 | Brown | 340/506 |
| 7,194,503 B2 * | 3/2007 | Shell et al. | 709/202 |
| 7,194,526 B2 * | 3/2007 | Kanemitsu | 709/220 |
| 7,836,158 B2 * | 11/2010 | Kasatani | 709/220 |
| 2004/0145973 A1 | 7/2004 | Nagashima | |
| 2005/0055547 A1 | 3/2005 | Kawamura | |
| 2006/0023254 A1 | 2/2006 | Hikichi | |
| 2007/0050460 A1 * | 3/2007 | Kasatani | 709/206 |
| 2007/0130223 A1 * | 6/2007 | Savilampi et al. | 707/203 |
| 2007/0279671 A1 | 12/2007 | Shouno | |
| 2008/0208908 A1 * | 8/2008 | Kashyap et al. | 707/104.1 |

FOREIGN PATENT DOCUMENTS

| | | |
|---|---|---|
| JP | 2004-271512 | 9/2004 |
| JP | 2005-085090 | 3/2005 |
| JP | 2006-040061 | 2/2006 |
| JP | 2006-065813 | 3/2006 |
| JP | 2006-185004 | 7/2006 |
| JP | 2007-164640 | 6/2007 |
| JP | 2007-328450 | 12/2007 |

* cited by examiner

*Primary Examiner* — Gabriel Garcia
(74) *Attorney, Agent, or Firm* — Edwards Wildman Palmer LLP; David G. Conlin; George N. Chaclas

(57) ABSTRACT

A multifunction machine according to one embodiment of the present invention includes a clock means for recognizing time; a settings information storing means that stores settings information and an updated time; a synchronization target information storing means that stores synchronization target information that specifies synchronization target multifunction machines whose settings information is to be synchronized; a sending means that sends updated settings information and the updated time of the settings information to the synchronization target multifunction machines when the settings information stored in the settings information storing means is updated by a user's operation; a receiving means that receives the settings information and the updated time sent from other multifunction machines; and a synchronization/update means that updates the settings information stored in the settings information storing means based on the received settings information.

13 Claims, 17 Drawing Sheets

Updated Time   September 11, 2007   16:54   — 203

| User | Printing | Facsimile Transmission | Scanning | Copying |
|---|---|---|---|---|
| User a | Permitted | Permitted | Permitted | Permitted |
| User b | Permitted | Not Permitted | Not Permitted | Permitted |
| User c | Permitted | Not Permitted | Not Permitted | Permitted |
| User d | Permitted | Permitted | Not Permitted | Permitted |

| Updated Time September 11, 2007 16:54 | | Use Restriction Settings | | | | | Preferred Operational Settings | | | |
|---|---|---|---|---|---|---|---|---|---|---|
| User | User Group | Printing | Facsimile Transmission | Scanning | Copying | Print Setting | Facsimile Setting | Scanner Setting | Copy Setting |
| User a | Accounting Section | Permitted | Permitted | Permitted | Permitted | Setting P1 | Setting F1 | Setting S1 | Setting C1 |
| User b | Accounting Section | Permitted | Not Permitted | Permitted | Permitted | Setting P2 | — | Setting S2 | Setting C2 |
| User c | Development Section | Permitted | Not Permitted | Not Permitted | Permitted | Setting P2 | — | — | Setting C1 |
| User d | Development Section | Permitted | Permitted | Not Permitted | Permitted | Setting P2 | — | — | Setting C1 |

MULTIFUNCTION MACHINE AND SYNCHRONIZATION SYSTEM

CROSS-REFERENCE TO RELATED APPLICATIONS

This application claims priority under 35 U.S.C. §119(a) on Japanese Patent Application No. 2008-004811 filed in Japan on Jan. 11, 2008, the entire contents of which are herein incorporated by reference.

BACKGROUND OF THE INVENTION

Field of the Invention

The present invention relates to a multifunction machine that is capable of synchronizing settings information with other multifunction machines that are connected via a network, the settings information including use restriction settings information that indicates use restriction settings of various functions for each user; and a synchronization system in which two or more of these multifunction machines are connected via a network.

Conventionally, a multifunction machine provided with a plurality of functions such as a copy function, a print function, and a facsimile function is connected to a plurality of personal computers (in the following, referred to as PCs) via a network and is installed in offices. Use of such various functions provided in the multifunction machine by all users is not preferable in terms of security.

Therefore, in a multifunction machine installed in an office, use restriction settings for restricting functions to be used by each user are provided. When, for example, the use restriction settings have to be changed because of an increasing or decreasing number of users in an office where a plurality of multifunction machines with such use restriction settings are applied are installed, the use restriction settings have to be changed for each multifunction machine installed in the office. That is, the more the number of the multifunction machines installed in the office, the more the work for changing the use restriction settings.

Thus, a use restriction management device capable of collectively managing the use restriction of the plurality of multifunction machines that are connected via a network has been proposed (for example, JP2007-164640A). According to this use restriction management device, because the use restriction settings do not have to be applied to the multifunction machines individually, the use restrictions can be changed efficiently based on an increasing or decreasing number of users.

However, installing a use restriction management device as described above in addition to a multifunction machine in an office imposes burden in terms of costs, because installment costs for the use restriction management device are added to the installment costs for the multifunction machine.

SUMMARY OF THE INVENTION

The present invention was made in light of such circumstances, and it is an object thereof to provide a multifunction machine that is capable of synchronizing use restriction settings information that indicates use restriction settings for each user with other multifunction machines that are connected via a network, and a synchronization system in which two or more such multifunction machines are connected via a network.

In a multifunction machine according to the present invention, settings information including use restriction settings information that indicates use restriction settings of various functions for individual users is set in synchronization with other multifunction machines that are connected via a network, and the multifunction machine includes: a clock means for recognizing time; a settings information storing means that stores settings information and an updated time recognized by the clock means when the settings information is updated; a synchronization target information storing means that stores synchronization target information that specifies synchronization target multifunction machines whose settings information is to be synchronized; a sending means that sends updated settings information and the updated time of the settings information to the synchronization target multifunction machines specified by the synchronization target information stored in the synchronization target information storing means when the settings information stored in the settings information storing means is updated by a user's operation; a receiving means that receives the settings information and the updated time of the settings information sent from the other multifunction machines; and a synchronization/update means that updates the settings information stored in the settings information storing means based on the received settings information when the updated time received by the receiving means is later than the updated time stored in the settings information storing means.

According to such a configuration, when settings information in one multifunction machine out of a plurality of multifunction machines that are connected via a network is updated, the updated settings information is reflected in the settings information of other multifunction machines connected via the network. That is, when it is necessary that settings information be changed in each of a plurality of multifunction machines installed in an office and connected via a network, because when the settings information of one multifunction machine installed in the office is changed, the change is automatically reflected in settings information of other multifunction machines, it is not necessary that a user change settings information of the respective multifunction machines installed in the office individually.

Furthermore, because the multifunction machine is configured such that settings information can be sent from and to other multifunction machines connected via the network, and own settings information can be updated based on the received settings information, just by connecting a plurality of multifunction machines via a network, settings information of multifunction machines can be synchronized. That is, because it is not necessary that a server, other than multifunction machines, for updating settings information of each multifunction machine at once is connected in the network, settings information of multifunction machines can be synchronized with a low-cost configuration.

Furthermore, the multifunction machine according to the present invention may be configured such that a synchronization requesting means that, when the settings information stored in the settings information storing means is updated by a user's operation, sends a synchronization request to the synchronization target multifunction machines specified by the synchronization target information stored in the synchronization target information storing means; and a synchronization responding means that responds to the synchronization request sent by the synchronization requesting means of the other multifunction machines are provided, wherein the sending means sends updated settings information and an updated time of the settings information to the synchronization target multifunction machines when the synchronization target multifunction machines can be synchronized based on the response from the synchronization responding means of the synchronization target multifunction machines.

According to such a configuration, because a synchronization request can be issued to the synchronization target multifunction machines, reliability for synchronization of settings information in a plurality of multifunction machines that are connected via a network increases.

Furthermore, the multifunction machine according to the present invention may be provided with a notification/selection means that, when there is no response to the synchronization request from the synchronization target multifunction machines to which the synchronization request is issued by the synchronization requesting means, or when there is a response indicating that synchronization cannot be executed from the synchronization target multifunction machines, notifies a user that the synchronization target multifunction machines cannot be synchronized, and allows the user to select whether or not a synchronization request is issued again.

According to such a configuration, when the synchronization target multifunction machine cannot receive settings information or cannot update settings information because the synchronization target multifunction machine is in a process of executing a job or the machine is down, a notification indicating that synchronization of synchronization target multifunction machines cannot be executed can be given to the user, and the user can be asked whether or not the synchronization request is to be issued again to the synchronization target multifunction machines, that is, whether or not synchronization of settings information in synchronization target multifunction machines is to be retried. Therefore, reliability for synchronization of settings information in a plurality of multifunction machines that are connected via a network further increases.

Furthermore, in the multifunction machine according to the present invention, the settings information may include operational settings information relating to operational settings of various functions for respective users.

According to such a configuration, operational settings information for easily fetching functions and settings frequently used by respective users can be easily registered to the respective multifunction machines that are connected via a network.

Furthermore, the multifunction machine according to the present invention may include a user authorization storing means that stores user authorization information for specifying a user who has authorization to update the settings information, wherein a user who can update the settings information stored in the settings information storing means is limited to a user specified by the user authorization information stored in the user authorization storing means.

According to such a configuration, because a user who can update settings information can be limited to, for example, a specific user such as a system administrator, the settings information can be prevented from being updated by various users without permission.

Furthermore, the multifunction machine according to the present invention may be configured such that a user authorization determination means that determines whether or not a user that operates a source multifunction machine of settings information has authorization to update the settings information of the settings information storing means based on the user authorization information stored in the user authorization storing means is provided, wherein the synchronization/update means updates the settings information stored in the settings information storing means according to the settings information received by the receiving means only when the user authorization determination means determined that the user has the authorization.

According to such a configuration, settings information of the synchronization target multifunction machine is not updated when a user that operates the source multifunction machine of settings information is not authorized to update settings information of the synchronization target multifunction machine. Therefore, a user who can update settings information can be reliably limited in the respective multifunction machines that are connected via a network.

Furthermore, the multifunction machine according to the present invention may be provided with an authorization error notification means that, when the user authorization determination means determines that there is no authorization, notifies the user that operates the source multifunction machine of settings information that there is no authorization to update the settings information of the synchronization target multifunction machines.

According to such a configuration, reliability for synchronization of settings information in a plurality of multifunction machines that are connected via a network increases because a user can be notified that he/she has no authorization to update settings information of the synchronization target multifunction machine when there is no authorization to update settings information of the synchronization target multifunction machine.

Furthermore, the multifunction machine according to the present invention may be provided with a synchronization error notification means that notifies the user that operates the source multifunction machine of settings information of a synchronization error when the settings information is not updated properly by the synchronization/update means.

According to such a configuration, reliability for synchronization of the settings information in a plurality of multifunction machines that are connected via a network increases because a user can be notified of a synchronization error when settings information of the synchronization target multifunction machine cannot be updated.

Furthermore, the multifunction machine according to the present invention may be provided with a time synchronization means that synchronizes time recognized by the clock means with the time of the source multifunction machine of settings information when the receiving means receives settings information.

According to such a configuration, the settings information is updated properly so as to be synchronized with the source settings information by the synchronization/update means, because the time recognized by the clock means of the target multifunction machine is adjusted to the time recognized by the clock means of the source multifunction machine at a timing of updating the settings information by the synchronization/update means, even when the time recognized by the clock means is different in the source multifunction machine and target multifunction machine of settings information.

Furthermore, the multifunction machine according to the present invention may be configured such that an encryption means that encrypts communication between a plurality of multifunction machines that are connected via a network is included, wherein the sending means sends encrypted settings information, and the receiving means receives encrypted settings information.

According to such a configuration, settings information can be prevented from leaking externally. To be specific, it can prevent a user who cannot use the functions from using the functions of the multifunction machine by pretending to be other user, knowing use restriction of various functions for respective users from leaking of restriction settings information included in the settings information.

Furthermore, the multifunction machine according to the present invention may be configured such that the settings information stored in the settings information storing means is updated in user units or user group units, the sending means sends the settings information in the user units or the user group units, and the synchronization/update means updates the settings information stored in the settings information storing means in the user units or the user group units according to the settings information received by the receiving means.

According to such a configuration, because settings information stored in the settings information storing means is updated not for all the user's settings information, but for a specific user's or for a specific group of users' settings information, information included in the settings information can be limited to information relating to a specific user or a user group for respective multifunction machines without constraining the memory region of the multifunction machine.

Furthermore, the multifunction machine according to the present invention may be provided with an importing means that searches for another multifunction machine connected to a network, and imports settings information and synchronization target information of the retrieved multifunction machine to the settings information storing means and the synchronization target information storing means, respectively.

According to such a configuration, for example, when a multifunction machine is additionally installed in an office where a plurality of multifunction machines that are connected via a network are installed, settings information and synchronization target information can be easily stored in the settings information storing means and the synchronization target information storing means of the newly added multifunction machine using the settings information and the synchronization target information of the already installed multifunction machines, without manually storing the settings information and the synchronization target information in the settings information storing means and the synchronization target information storing means, respectively, in the newly added multifunction machine from the beginning.

In a synchronization system according to the present invention, two or more multifunction machines of the present invention are connected via a network.

According to such a configuration, for example, when a plurality of multifunction machines are installed in an office, settings information can be synchronized in multifunction machines installed in the office just by connecting the plurality of multifunction machines installed in the office via a network, that is, with a low-cost configuration.

BRIEF DESCRIPTION OF THE DRAWINGS

FIG. 18 is a diagram illustrating an example of contents stored in a settings information database of a multifunction machine according to Embodiment 8 of the present invention.

DESCRIPTION OF THE PREFERRED EMBODIMENTS

A multifunction machine according to embodiments of the present invention is described in the following with reference to the drawings.

<Embodiment 1>

Figure 1:
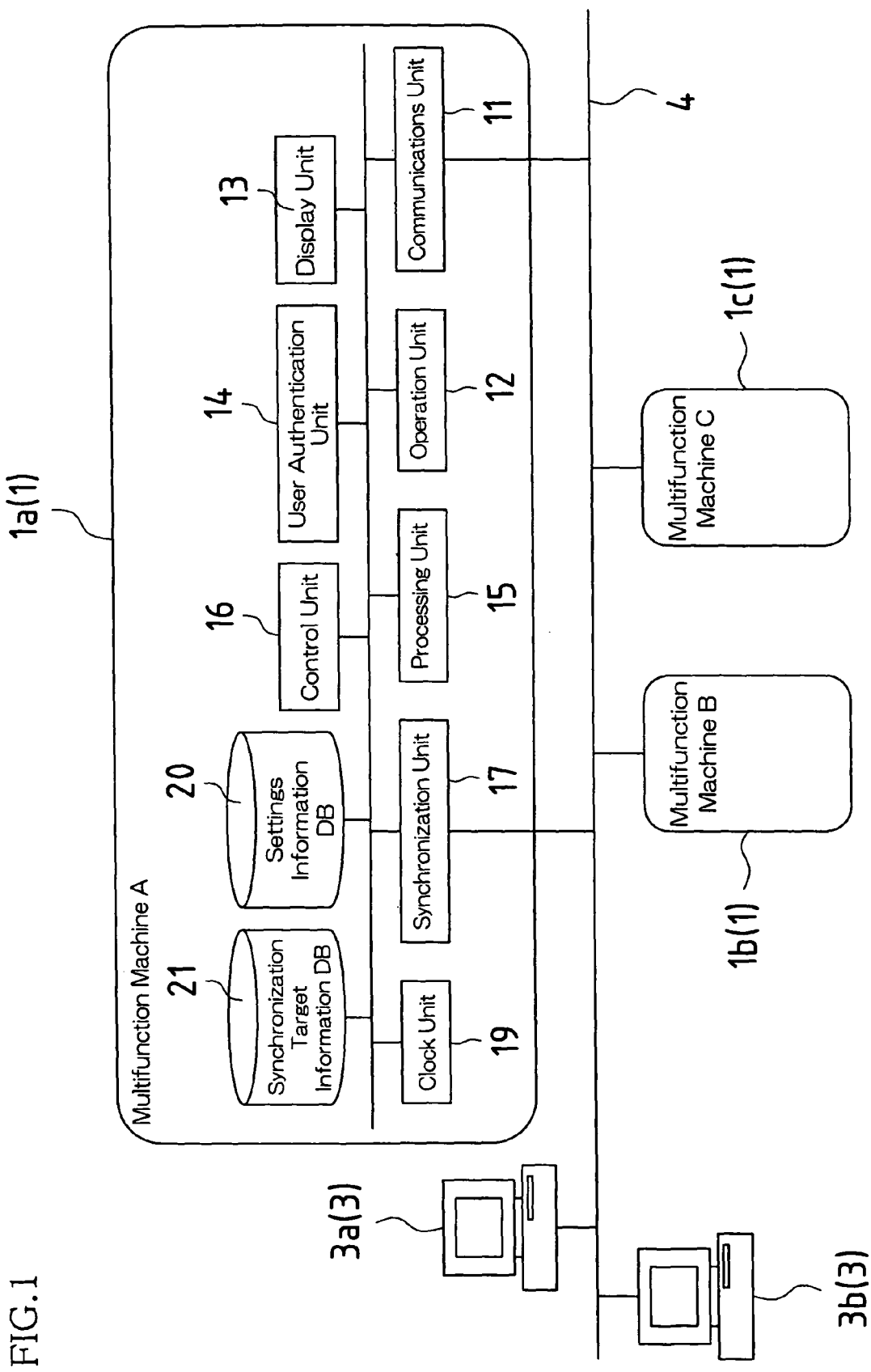
FIG. 1 is a functional block diagram illustrating the functional configuration of a synchronization system made up of multifunction machines that are connected via a network according to Embodiment 1 of the present invention.

FIG. 1 is a functional block diagram illustrating the functional configuration of a synchronization system made up of multifunction machines according to Embodiment 1 of the present invention connected via a network. In FIG. 1, functional configurations of a multifunction machine B1b and a multifunction machine C1c are the same as that of a multifunction machine A1a, and therefore those configurations are omitted.

The synchronization system according to Embodiment 1 of the present invention is configured to include a plurality of multifunction machines provided with various functions such as printing, facsimile transmission, scanning, and copying (The multifunction machine A is denoted as 1a, the multifunction machine B is denoted as 1b, and the multifunction machine C is denoted as 1c. When no distinction is necessary, the multifunction machines are denoted as multifunction machines 1 or a multifunction machine 1.), and a plurality of PCs (Denoted as 3a and 3b. When no distinction is necessary, the PCs are denoted as PCs 3 or a PC 3.) connected via a communications network 4. For example, the system is configured such that image data or document data sent from a PC 3 is received by a designated multifunction machine 1, and the multifunction machine 1 performs a facsimile transmission or printing. Furthermore, for example, image data scanned by a multifunction machine 1 is stored in a designated PC 3.

The multifunction machine 1 is configured from a communications unit 11, an operation unit 12, a display unit 13, a user authentication unit 14, a processing unit 15, a control unit 16, a synchronization unit 17, a clock unit 19, a settings information database 20, and a synchronization target information database 21.

The communications unit 11 is a communications interface compliant with the communications standard of the communications network 4. The communications unit 11 is configured from, for example, a communication control card such as a LAN card, such that various data is sent/received from and input/output to the PCs 3 connected to the communications network 4 via a communication line such as a LAN cable.

The operation unit 12 is configured from an input device such as a tablet, which receives commands and inputs from a user using the multifunction machine 1. The display unit 13 is configured from a display device such as a liquid crystal display, which displays information input through the operation unit 12 or the communications unit 11.

The user authentication unit 14 authenticates a user that uses the multifunction machine 1. To be specific, the user authentication unit 14 determines whether or not authentication information (user ID and password) of the user input through the operation unit 12, or authentication information of the user input through the communications unit 11 is correct (matches the authentication information stored in advance). When the information is correct, use of the multifunction machine 1 is permitted, and when the information is not correct, use of the multifunction machine 1 is not permitted. The method for authenticating users is not limited to the method described above, and the authentication unit 14 may be configured so as to receive an IP address set in a PC3 used by the user at the communications unit 11 and determine whether or not the user authenticated by the received IP address can use the multifunction machine 1.

The processing unit 15 is configured to perform any of print, facsimile transmission, scan, and copy processing based on a command from a control unit 16 to be mentioned later.

The control unit 16 is configured to control the communications unit 11, the operation unit 12, the display unit 13, the user authentication unit 14, the processing unit 15, the synchronization unit 17, the clock unit 19, the settings information database 20, and the synchronization target information database 21.

For example, when executing printing, facsimile transmission, scanning, and copying, the control unit 16 first determines, based on use restriction settings information stored in a settings information database 20 to be mentioned later, whether or not the user authenticated by the user authentication unit 14 is authorized to make use of the processing (printing, facsimile transmission, scanning, or copying) indicated in a processing command input through the operation unit 12 or the communications unit 11. When it is determined that the user is authorized to make use of the processing, the processing unit 15 is allowed to execute the processing of printing, facsimile transmission, scanning, or copying based on the processing command. When it is determined that the user is not authorized to make use of the processing, the user is notified that the user is not authorized to make use of the processing indicated in the processing command. This notification may be executed by allowing the control unit 16 to output an authorization error message to the display unit 13. Or, this notification may be executed by allowing the control unit 16 to send the authorization error message to the PC 3 used by the user that operates the multifunction machine 1 via the communications unit 11.

The settings information database 20 is configured as a settings information storing means for storing settings information including use restriction settings information that indicates use restriction settings of various functions (printing, facsimile transmission, scanning, and copying) for each user, and an updated time recognized by a clock unit 19 to be described later when updating the settings information. The settings information stored in the settings information database 20 is updated based on settings information input through the operation unit 12 or the communications unit 11. Or, the settings information stored in the settings information database 20 is updated by a synchronization/update unit 173 of the synchronization unit 17 to be mentioned later.

Furthermore, the settings information stored in the settings information database 20 can be updated in user units. To be specific, for example, the settings information stored in the settings information database 20 can be updated for only the settings information of a specific user designated through the operation unit 12 or the communications unit 11.

Figures 2, 3:
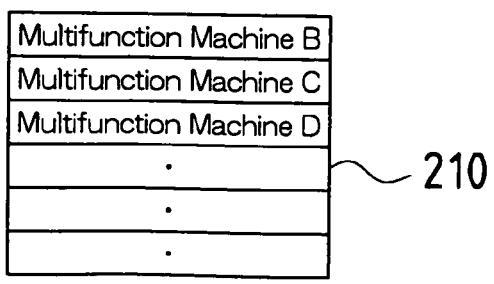
FIG. 2 is a diagram illustrating an example of settings information stored in a settings information database of a multifunction machine according to Embodiment 1 of the present invention.
FIG. 3 is a diagram illustrating an example of synchronization target information stored in a synchronization target information database of a multifunction machine according to Embodiment 1 of the present invention.

FIG. 2 is a diagram illustrating an example of settings information stored in a settings information database of a multifunction machine according to Embodiment 1 of the present invention.

As described above, the settings information database 20 stores settings information 201 including use restriction settings information 202 along with an updated time 203 indicating the update time of the settings information 201.

The use restriction settings information 202 indicates whether or not the various functions (copying, facsimile transmission, scanner, and printing) provided in the multifunction machine 1 can be used by users (permitted, not-permitted) individually (user a, user b, and so on). For example, the use restriction settings information 202 indicates that user "a" can use all the functions of printing, facsimile transmission, scanning, and copying, and user "b" can use print and copy functions but cannot use scanning and facsimile transmission functions.

The synchronization target information database 21 is configured as a synchronization target information storing means for storing synchronization target information for specifying synchronization target multifunction machines 1 in which the settings information 201 stored in the settings information database 20 is to be synchronized.

FIG. 3 is a diagram illustrating an example of synchronization target information stored in a synchronization target information database of a multifunction machine according to Embodiment 1 of the present invention.

FIG. 3 indicates synchronization target information 210 stored in the synchronization target information database 21 of the multifunction machine A1a, showing a multifunction machine B1b, a multifunction machine C1c, and so on as the synchronization target multifunction machines of the multifunction machine A1a.

The clock unit 19 is configured as a clock means for recognizing time. For example, when the settings information 201 stored in the settings information database 20 is updated based on settings information input through the operation unit 12 or the communications unit 11, the clock unit 19 recognizes the time when the settings information is updated. Then, the recognized updated time 203 is, as described above, stored in the settings information database 20 in association with the updated settings information 201.

The synchronization unit 17 is configured as a synchronization means for setting the settings information by synchronizing other multifunction machines 1 connected via the network 4.

Figure 4:
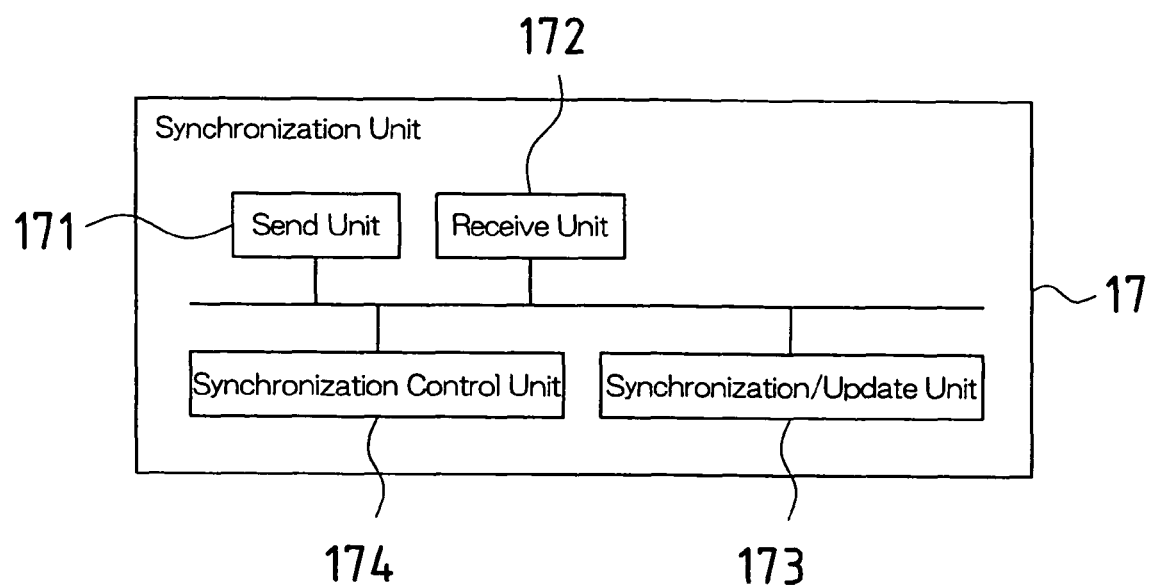
FIG. 4 is a functional block diagram specifically illustrating the functional configuration of a synchronization unit of a multifunction machine according to Embodiment 1 of the present invention.

FIG. 4 is a functional block diagram specifically illustrating the functional configuration of a synchronization unit of a multifunction machine according to Embodiment 1 of the present invention.

The synchronization unit 17 is configured from a send unit 171, a receive unit 172, a synchronization/update unit 173, and a synchronization control unit 174.

The send unit 171 is configured as a sending means for sending updated settings information and an updated time of the settings information to synchronization target multifunction machines 1 specified by the synchronization target information stored in the synchronization target information database 21 when the settings information stored in the settings information database 20 is updated by a user's operation (input operation through the operation unit 12 or the communications unit 11).

Furthermore, the send unit 171 can send the settings information in user units. To be specific, the send unit 171 can send only the settings information of a user whose settings information has been updated among the settings information of respective users stored in the settings information database 20.

The receive unit 172 is configured as a receiving means for receiving the settings information and the updated time of the settings information that is sent from a send unit 171 of other multifunction machine 1.

The synchronization/update unit 173 is configured as a synchronization/update means for updating settings information stored in the settings information database 20 of own multifunction machine 1 based on the settings information received in the receive unit 172 of own multifunction machine 1.

Furthermore, the synchronization/update unit 173 can update the settings information stored in the settings information database 20 in user units based on the settings information received in the receive unit 172. To be specific, the synchronization/update unit 173 can update the settings information stored in the settings information database 20 of only a specific user received in the receive unit 172.

The synchronization control unit 174 controls the send unit 171, the receive unit 172, and the synchronization/update unit 173 that constitute the synchronization unit 17, and by allowing the synchronization control unit 174 to control each of the units 171 to 173 that constitute the synchronization unit 17, synchronization/setting processing, in which the settings information of other multifunction machines 1 connected via the network 4 are synchronized and set, is executed.

In the following, operation of synchronization/setting processing that is executed by the multifunction machine 1 according to this embodiment, that is, operation of synchronization/setting processing in which the settings information of other multifunction machines 1 connected via the network 4 are synchronized, is described.

Figure 5:
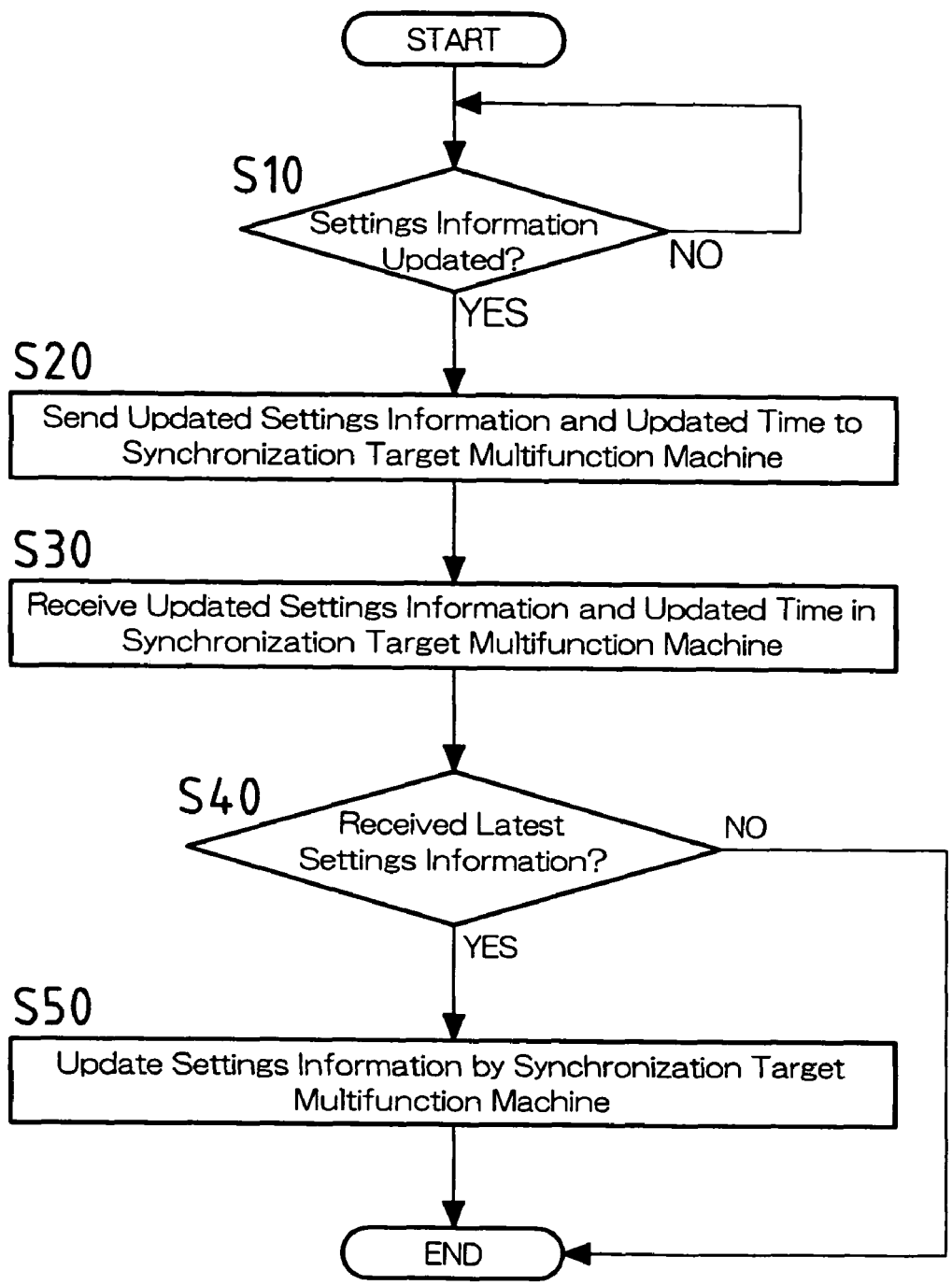
FIG. 5 is a flowchart illustrating operation of synchronization/setting processing in multifunction machine according to Embodiment 1 of the present invention, in which settings information is synchronized with other multifunction machines that are connected via a network.

FIG. 5 is a flowchart illustrating operation of synchronization/setting processing in multifunction machine according to Embodiment 1 of the present invention, in which settings information is synchronized with other multifunction machines that are connected via a network.

Step S10:

The control unit 16 determines whether or not the settings information stored in the settings information database 20 is updated by a user's operation. When the settings information is updated, a determination of "Yes" is made and the process moves to step S20, and when the settings information is not updated, a determination of "No" is made and this step is repeated.

Step S20:

The control unit 16 notifies the synchronization control unit 174 of the synchronization unit 17 that the settings information was updated, and the synchronization control unit 174 that received such notification gives a "send" command to the send unit 171. The send unit 171 that received this "send" command sends the updated settings information and the updated time of the settings information to synchronization target multifunction machines 1. At this time, the synchronization target multifunction machines 1 are determined based on the synchronization target information stored in the synchronization target information database 21.

For example, when settings information stored in the settings information database 20 is updated by a user's operation in the multifunction machine A1a, the send unit 171 of the multifunction machine A1a refers to the synchronization target information shown in FIG. 3, and sends the updated settings information and the updated time of the settings information to the synchronization targets, i.e., the multifunction machine B1b, the multifunction machine C1c, and so on.

Step S30:

The updated settings information and the updated time of the settings information are received by the synchronization target multifunction machine 1. For example, when the send unit 171 of the multifunction machine A1a sends the updated settings information and the updated time of the settings information to the synchronization targets, the multifunction machine B1b and the multifunction machine C1c, in step S20, the receive unit 172 of the multifunction machine B1b and of the multifunction machine C1c receives the settings information and the updated time sent from the send unit 171 of the multifunction machine A1a in step S30.

Step S40:

The synchronization control unit 174 of the synchronization target multifunction machine 1 which received the settings information determines whether or not the settings information received in the receive unit 172 is the latest settings information. That is, the synchronization control unit 174 determines whether or not the updated time received in the receive unit 172 is later than the updated time stored in the settings information database 20. When the settings information received in the receive unit 172 is the latest settings information, that is, when the updated time received in the receive unit 172 is later than the updated time stored in the settings information database 20, a determination of "Yes" is made, and a synchronization/update command is given to the synchronization/update unit 173. That is, the process moves to step S50. When the settings information received in the receive unit 172 is not the latest settings information, that is, when the updated time received in the receive unit 172 is earlier than the updated time stored in the settings information database 20, a determination of "No" is made, and the synchronization/setting processing is ended.

Step S50:

The synchronization/update unit 173 of the synchronization target multifunction machine 1 that received the settings information updates the settings information stored in the settings information database 20 based on the settings information received in the receive unit 172, and the synchronization/setting processing is ended.

The processing in steps S30 to S50 is executed in the respective synchronization target multifunction machines 1 that received the settings information. That is, for example, when the send unit 171 of the multifunction machine A1a sends the updated settings information and the updated time of the settings information to the synchronization targets, the multifunction machine B1b and the multifunction machine C1c, in step S20, the processing in steps S30 to S50 is executed in the respective synchronization targets, i.e., individually in the multifunction machine B1b and in the multifunction machine C1c.

<Embodiment 2>

A synchronization system according to Embodiment 2 of the present invention includes, as in the case of the synchronization system according to Embodiment 1 (ref. FIG. 1), a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment is configured similarly to the multifunction machine 1 according to Embodiment 1. That is, it is configured from a communications unit 11, an operation unit 12, a display unit 13, a user authentication unit 14, a processing unit 15, a control unit 16, a synchronization unit 17, a clock unit 19, a settings information database 20, and a synchronization target information database 21. In the following, aspects of the configuration different from Embodiment 1 are described.

Figure 6:
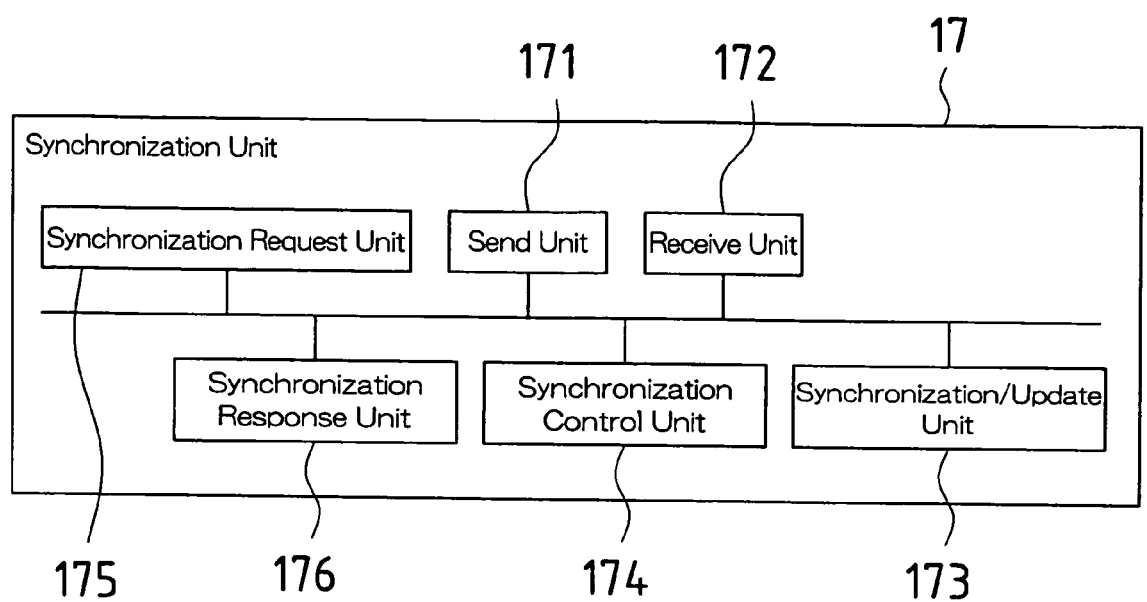
FIG. 6 is a functional block diagram specifically illustrating the functional configuration of a synchronization unit of a multifunction machine according to Embodiment 2 of the present invention.

FIG. 6 is a functional block diagram specifically illustrating the functional configuration of a synchronization unit of a multifunction machine according to Embodiment 2 of the present invention.

The synchronization unit 17 of the multifunction machine 1 according to this embodiment is configured such that a synchronization request unit 175 and a synchronization response unit 176 are additionally provided in the synchronization unit 17 of the multifunction machine 1 according to Embodiment 1 (ref. FIG. 4). That is, in the synchronization unit 17 of the multifunction machine 1 according to this embodiment, the synchronization control unit 174 controls the send unit 171, the receive unit 172, the synchronization/update unit 173, the synchronization request unit 175, and the synchronization response unit 176 that constitute the synchronization unit 17 to execute the synchronization/setting processing.

The synchronization request unit 175 is configured as a synchronization requesting means for sending a synchronization request to synchronization target multifunction machines 1 that are specified in the synchronization target information stored in the synchronization target information database 21, when the settings information stored in the settings information database 20 is updated by a user's operation.

The synchronization response unit 176 is configured as a synchronization responding means for responding to the synchronization request sent by the synchronization request unit 175 of another multifunction machine 1 connected via the network 4.

In the following, operation of synchronization/setting processing executed by the synchronization unit 17 of the multifunction machine 1 according to this embodiment is described. In the operation of synchronization/setting processing executed in this embodiment, descriptions are omitted for operations that are the same as the operations (steps) described in Embodiment 1.

Figure 7:
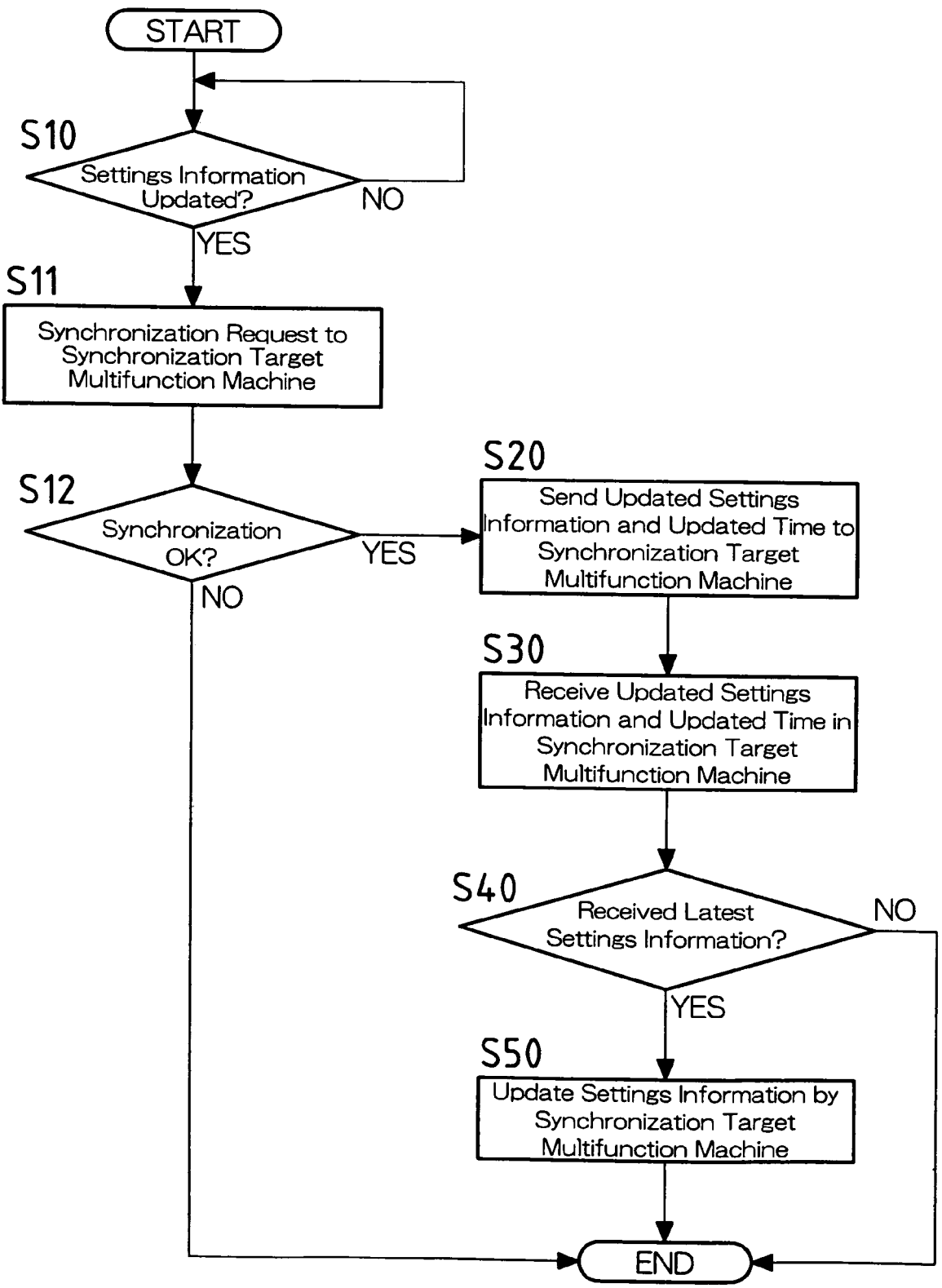
FIG. 7 is a flowchart illustrating operation of synchronization/setting processing that synchronizes settings information in a multifunction machine according to Embodiment 2 of the present invention with other multifunction machines that are connected via a network.

FIG. 7 is a flowchart illustrating operation of synchronization/setting processing that synchronizes settings information in a multifunction machine according to Embodiment 2 of the present invention with other multifunction machines that are connected via a network.

The operation of synchronization/setting processing executed in this embodiment is substantially the same as the operation of synchronization/setting processing in Embodiment 1 (ref. FIG. 5), but in the synchronization/setting processing executed in this embodiment, the process moves to step S11 when a determination of "Yes" is made in step S10 (when it is determined that the settings information is updated by a user's operation).

Step S11:

The control unit 16 notifies the synchronization control unit 174 of the synchronization unit 17 that the settings information is updated, and the synchronization control unit 174 that received the notification issues a synchronization request command to the synchronization request unit 175. The synchronization request unit 175 that received this synchronization request command sends a synchronization request to synchronization target multifunction machines 1. At this time, the synchronization target multifunction machines 1 are determined based on the synchronization target information stored in the synchronization target information database 21.

Step S12:

The synchronization control unit 174 determines whether or not the synchronization target multifunction machines 1 can be synchronized with the settings information. That is, a determination is made as to if a response indicating that synchronization is possible was made from the synchronization response unit 176 of the synchronization target multifunction machine 1 to the synchronization request sent in step S11. When there is no response to the synchronization request from the synchronization target multifunction machine 1, or when a response indicating that synchronization is not possible is made from the synchronization target multifunction machine 1, a determination of "No" is made, and the synchronization/setting processing is ended. On the other hand, when a response indicating that synchronization is possible is made to the synchronization request from the synchronization target multifunction machine 1, a determination of "Yes" is made, and the synchronization control unit 174 issues a "send" command to the send unit 171. That is, the process moves to step S20, and the synchronization/setting processing is ended after the processing in steps S30 to S50.

As in Embodiment 1, the processing in steps S30 to S50 is executed individually in the respective synchronization target multifunction machines 1 that received the settings information. That is, for example, when the send unit 171 of the multifunction machine A1a sends the updated settings information and the updated time of the settings information to the synchronization targets, i.e., the multifunction machine B1b and the multifunction machine C1c, in step S20, the processing in steps S30 to S50 is executed individually in the synchronization targets, i.e., the multifunction machine B1b and in the multifunction machine C1c.

<Embodiment 3>

A synchronization system according to Embodiment 3 of the present invention includes, as in the case of the synchronization system according to Embodiments 1 and 2 (ref. FIG. 1), a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment is configured similarly to the multifunction machine 1 according to Embodiments 1 and 2. That is, it is configured from a communications unit 11, an operation unit 12, a display unit 13, a user authentication unit 14, a processing unit 15, a control unit 16, a synchronization unit 17, a clock unit 19, a settings information database 20, and a synchronization target information database 21.

Figure 8:
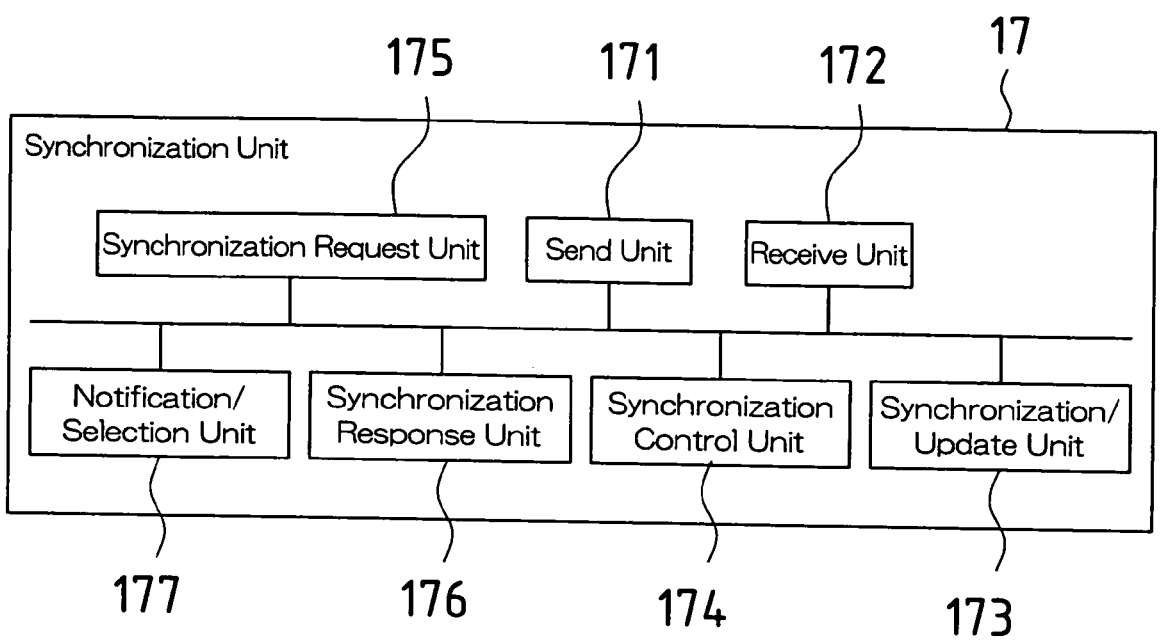
FIG. 8 is a functional block diagram specifically illustrating the functional configuration of a synchronization unit of a multifunction machine according to Embodiment 3 of the present invention.

FIG. 8 is a functional block diagram specifically illustrating the functional configuration of a synchronization unit of a multifunction machine according to Embodiment 3 of the present invention.

The synchronization unit 17 of the multifunction machine 1 according to this embodiment is configured such that a notification/selection unit 177 is additionally provided in the synchronization unit 17 of the multifunction machine 1 according to Embodiment 2 (ref FIG. 6). That is, in the synchronization unit 17 of the multifunction machine 1 according to this embodiment, the synchronization control unit 174 controls the send unit 171, the receive unit 172, the synchronization/update unit 173, the synchronization request unit 175, the synchronization response unit 176, and the notification/selection unit 177 that constitute the synchronization unit 17 to execute the synchronization/setting processing.

The notification/selection unit 177 is configured as a notification/selection means for notifying a user that the synchronization target multifunction machine 1 cannot be synchronized, and allowing the user to select whether or not a synchronization request is to be issued again, when there is no response to a synchronization request, from the synchronization target multifunction machine 1 to which the synchronization request is issued by the synchronization request unit 175, or when there is a response indicating that synchronization is not possible, from the synchronization target multifunction machine 1.

For example, the notification/selection unit 177 notifies a user that the synchronization target multifunction machine 1 cannot be synchronized by displaying a message such as "Synchronization target multifunction machine cannot be synchronized. Reissue synchronization request?" on the display unit 13, or on a screen of the PC 3 used by the user through the communications unit 11, and allows the user to select whether or not the synchronization request is issued again.

In the following, operation of synchronization/setting processing executed by the synchronization unit 17 of the multifunction machine 1 according to this embodiment is described. In the operation of synchronization/setting processing executed in this embodiment, descriptions are omitted for operations that are the same as the operations (steps) described in Embodiments 1 and 2.

Figure 9:
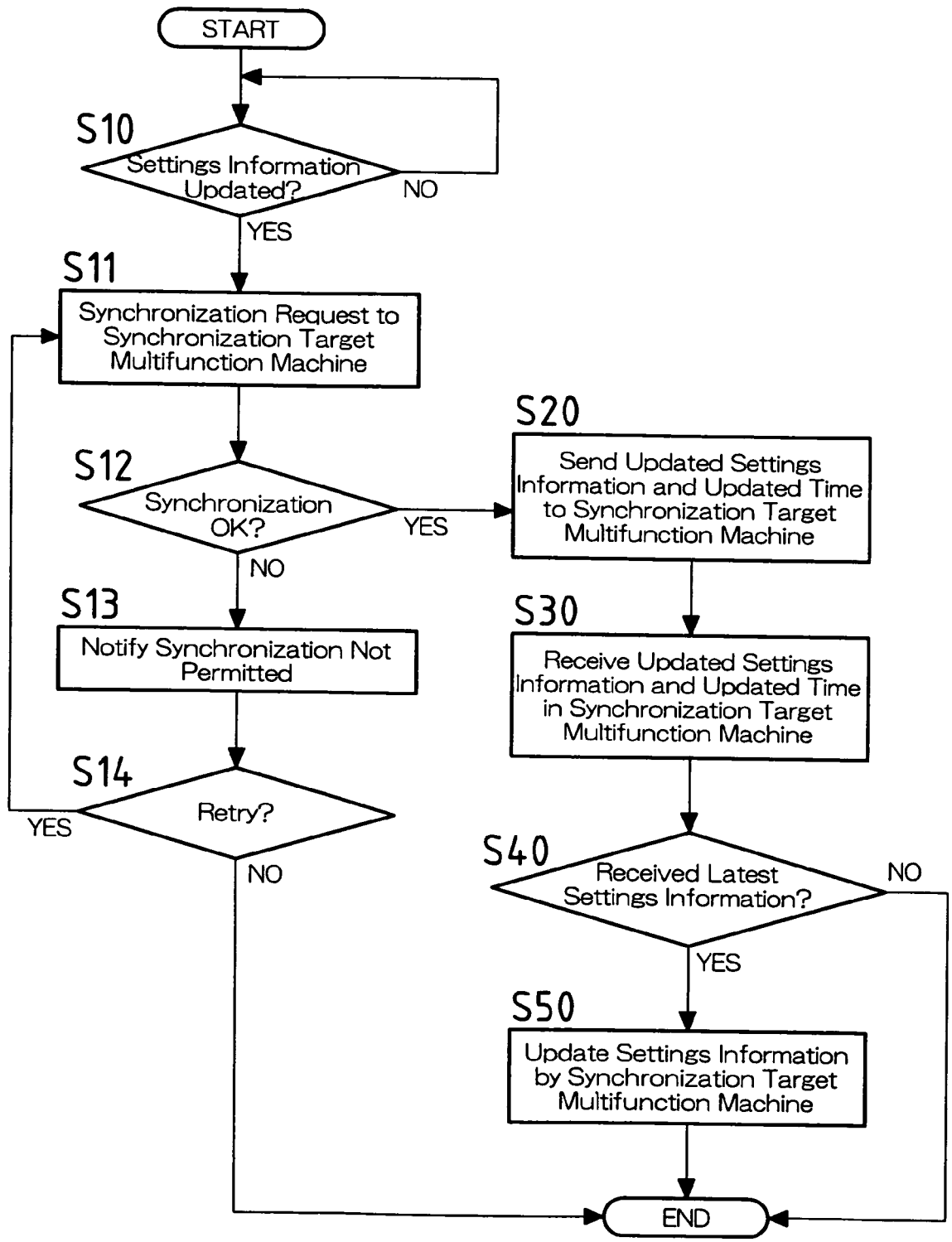
FIG. 9 is a flowchart illustrating operation of synchronization/setting processing that synchronizes settings information in a multifunction machine according to Embodiment 3 of the present invention with other multifunction machines that are connected via a network.

FIG. 9 is a flowchart illustrating operation of synchronization/setting processing in a multifunction machine according to Embodiment 3 of the present invention, in which settings information in other multifunction machines that are connected via a network are synchronized.

The operation of synchronization/setting processing executed in this embodiment is substantially the same as the operation of synchronization/setting processing in Embodiment 2 (ref. FIG. 7), and when a determination of "Yes" is made in step S12 (it is determined that synchronization is possible), the process moves to step S20, but when a determination of "No" is made in step S12 (it is determined that synchronization is not possible), the process moves to step S13.

Step S13:

The synchronization control unit 174 issues a notification/selection command to the notification/selection unit 177, and the notification/selection unit 177 notifies the user that the synchronization target multifunction machine 1 cannot be synchronized, and allows the user to select whether or not the synchronization request is to be reissued. Then, the process moves to step S14.

Step S14:

The synchronization control unit 174 determines whether or not a retry is to be executed, that is, determines whether or not the synchronization request is to be issued again to the synchronization target multifunction machines 1. To be specific, a determination is made as to if the user who received the notification in step S13 selected to reissue the synchronization request. When the user selected to reissue the synchronization request, a determination of "Yes" is made, and the synchronization control unit 174 issues a synchronization request command to the synchronization request unit 175. That is, the process returns to step S11. When the user does not select to reissue the synchronization request, a determination of "No" is made, and the synchronization/setting processing is ended.

As in Embodiments 1 and 2, the processing in steps S30 to S50 is executed individually in the respective synchronization target multifunction machines 1 that received the settings information. That is, for example, when the send unit 171 of the multifunction machine A1a sends the updated settings information and the updated time of the settings information to the synchronization targets, i.e., the multifunction machine B1b and the multifunction machine C1c, in step S20, the processing in steps S30 to S50 is executed individually in the synchronization targets, i.e., in the multifunction machine B1b and in the multifunction machine C1c.

<Embodiment 4>

A synchronization system according to Embodiment 4 of the present invention includes, as in the case of the synchronization system according to Embodiments 1 to 3 (ref. FIG. 1), a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment is configured similarly to the multifunction machine 1 according to Embodiments 1 to 3. That is, it is configured from a communications unit 11, an operation unit 12, a display unit 13, a user authentication unit 14, a processing unit 15, a control unit 16, a synchronization unit 17, a clock unit 19, a settings information database 20, and a synchronization target information database 21.

Figure 10:
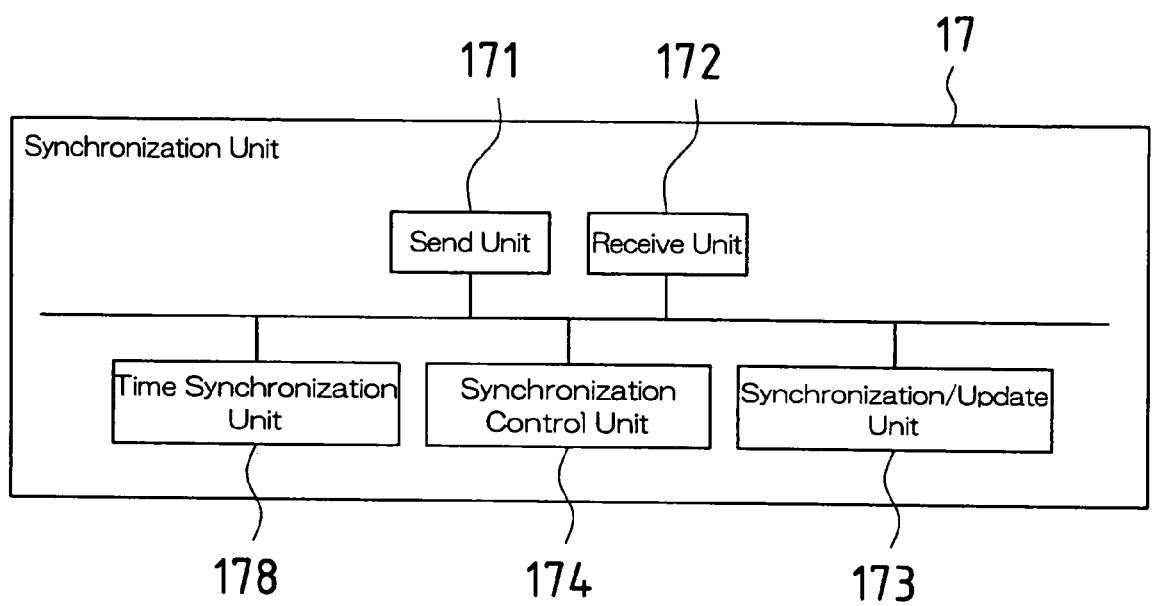
FIG. 10 is a functional block diagram specifically illustrating the functional configuration of a synchronization unit of a multifunction machine according to Embodiment 4 of the present invention.

FIG. 10 is a functional block diagram specifically illustrating the functional configuration of a synchronization unit of a multifunction machine according to Embodiment 4 of the present invention.

The synchronization unit 17 of the multifunction machine 1 according to this embodiment is configured such that a time synchronization unit 178 is additionally provided in the synchronization unit 17 of the multifunction machine 1 according to Embodiment 1 (ref. FIG. 4). That is, in the synchronization unit 17 of the multifunction machine 1 according to this embodiment, the synchronization control unit 174 controls the send unit 171, the receive unit 172, the synchronization/update unit 173, and the time synchronization unit 178 that constitute the synchronization unit 17 to execute the synchronization/setting processing.

The time synchronization unit 178 is configured as a time synchronization means for synchronizing time recognized by the clock unit 19 with a source multifunction machine 1 of the settings information when the receive unit 172 receives the settings information. That is, in this embodiment, the time synchronization unit 178 adjusts the time of the clock unit 19 to the time of the clock unit 19 in the source multifunction machine 1 of the settings information when the receive unit 172 receives the settings information.

In the following, operation of synchronization/setting processing executed by the synchronization unit 17 of the multifunction machine 1 according to this embodiment is described. In the operation of synchronization/setting processing executed in this embodiment, descriptions are omitted for operations that are the same as the operations (steps) described in Embodiments 1 to 3.

Figure 11:
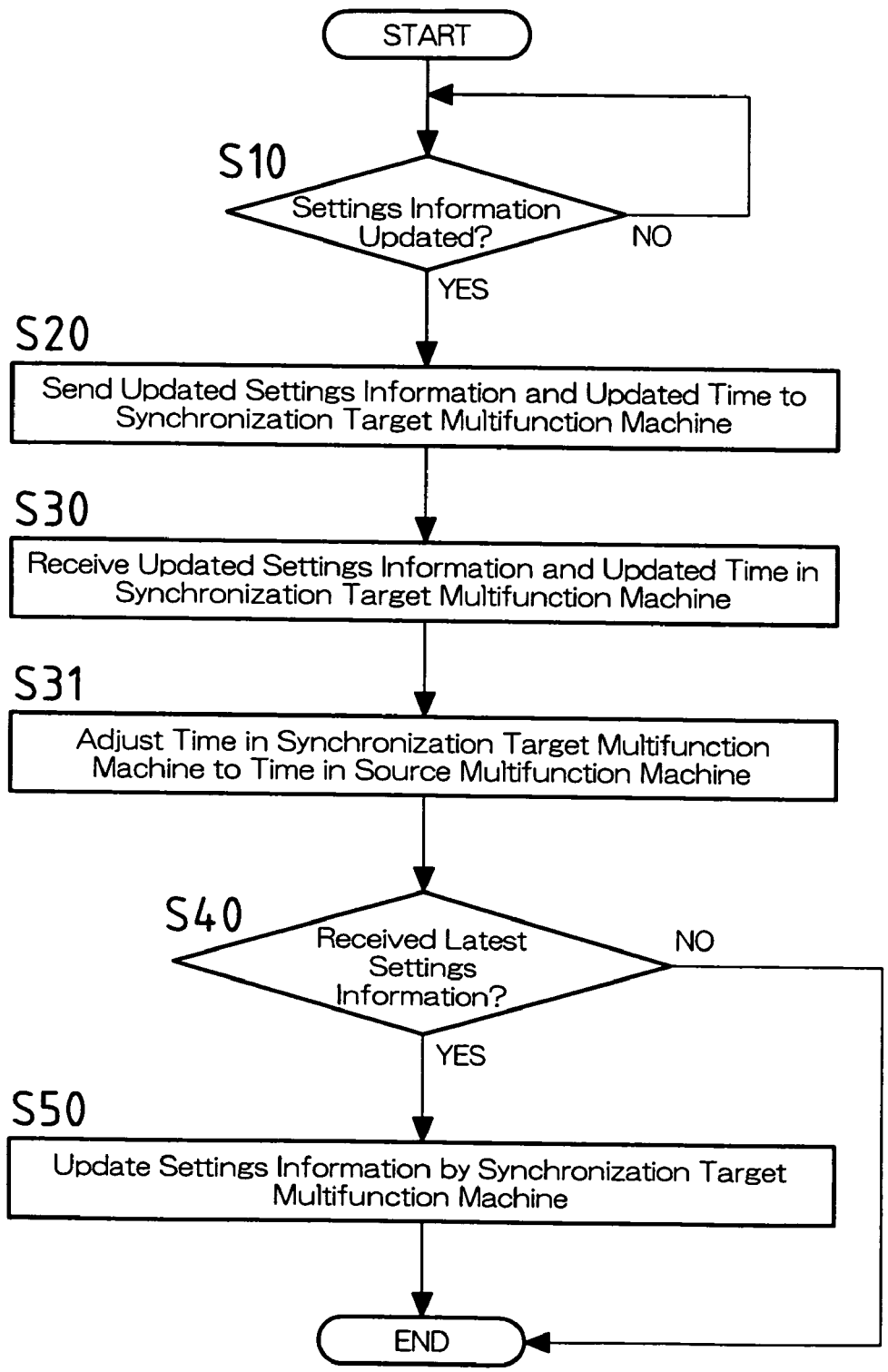
FIG. 11 is a flowchart illustrating operation of synchronization/setting processing that synchronizes settings information in a multifunction machine according to Embodiment 4 of the present invention with other multifunction machines that are connected via a network.

FIG. 11 is a flowchart illustrating operation of synchronization/setting processing that synchronizes settings information in a multifunction machine according to Embodiment 4 of the present invention with other multifunction machines that are connected via a network.

The operation of synchronization/setting processing executed in this embodiment is substantially the same as the operation of synchronization/setting processing in Embodiment 1 (ref. FIG. 5), but in the synchronization/setting processing in this embodiment, when the synchronization target multifunction machine 1 receives settings information in step S30, the process moves to step S31.

Step S31:

The synchronization control unit 174 of the synchronization target multifunction machine 1 issues a time synchronization command to the time synchronization unit 178, and the time synchronization unit 178 that received the time synchronization command corrects the time of the clock unit 19 so as to synchronize with the time of the clock unit 19 of the source multifunction machine 1 of the settings information. Then, the process moves to step S40, and the synchronization/setting processing is ended after going through step S50 according to the determination in step S40.

As in Embodiments 1 to 3, the processing in steps S30 to S50 is executed individually in the respective synchronization target multifunction machines 1 that received the settings information. That is, for example, when the send unit 171 of the multifunction machine A1a sends the updated settings information and the updated time of the settings information to the synchronization targets, i.e., the multifunction machine B1b and the multifunction machine C1c, in step S20, the processing in steps S30 to S50 is executed individually in the synchronization targets, i.e., in the multifunction machine B1b and in the multifunction machine C1c.

<Embodiment 5>

A synchronization system according to Embodiment 5 of the present invention includes, as in the case of the synchronization system according to Embodiments 1 to 4 (ref. FIG. 1), a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment is configured similarly to the multifunction machine 1 according to Embodiments 1 to 4. That is, it is configured from a communications unit 11, an operation unit 12, a display unit 13, a user authentication unit 14, a processing unit 15, a control unit 16, a synchronization unit 17, a clock unit 19, a settings information database 20, and a synchronization target information database 21.

Figure 12:
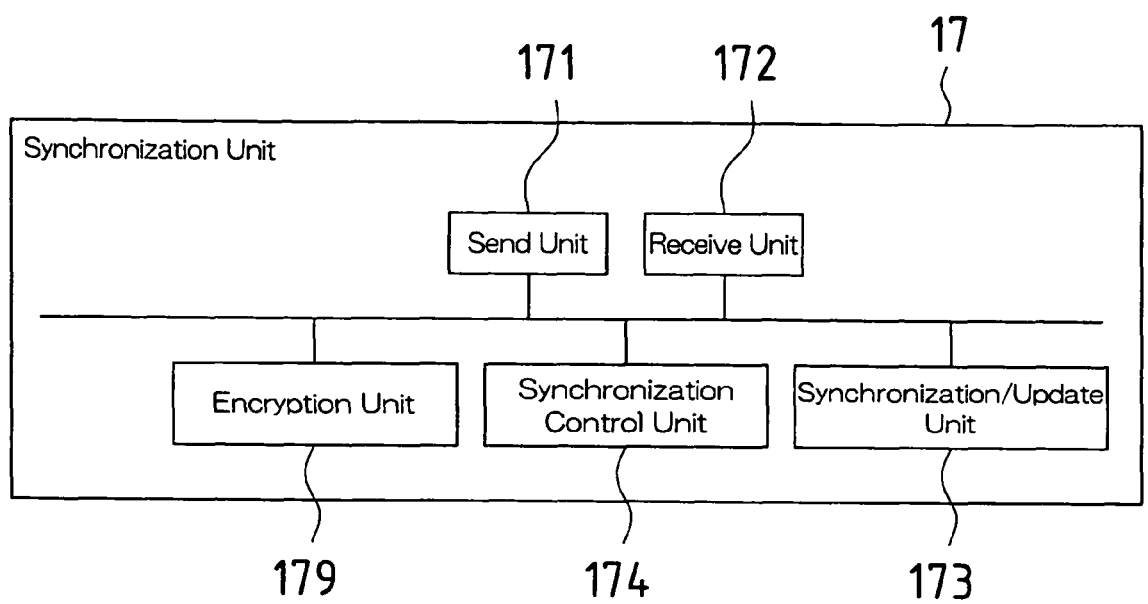
FIG. 12 is a functional block diagram specifically illustrating the functional configuration of a synchronization unit of a multifunction machine according to Embodiment 5 of the present invention.

FIG. 12 is a functional block diagram specifically illustrating the functional configuration of a synchronization unit of a multifunction machine according to Embodiment 5 of the present invention.

The synchronization unit 17 of the multifunction machine 1 in this embodiment is configured such that an encryption unit 179 is additionally provided in the synchronization unit 17 of the multifunction machine 1 according to Embodiment 1 (ref. FIG. 4). That is, in the synchronization unit 17 of the multifunction machine 1 according to this embodiment, the synchronization control unit 174 controls the send unit 171, the receive unit 172, the synchronization/update unit 173, and the encryption unit 179 that constitute the synchronization unit 17 to execute the synchronization/setting processing.

The encryption unit 179 is configured as an encryption means for encrypting communication between the plurality of multifunction machines 1 connected via the network 4.

That is, the synchronization system according to this embodiment is configured such that sending/receiving of settings information between the plurality of multifunction machines 1 connected via the network 4 is executed by encrypted communication; the send unit 171 sends settings information encrypted in the encryption unit 179; and the receive unit 172 receives encrypted settings information. The encryption of the settings information received in the receive unit 172 is decrypted by the encryption unit 179.

The operation of synchronization/setting processing executed in this embodiment is substantially the same as the operation of synchronization/setting processing in Embodiment 1 as shown in FIG. 5 and therefore descriptions thereof are omitted. In the synchronization/setting processing executed in this embodiment, in the sending processing of settings information in step S20, the settings information to be sent is encrypted by the encryption unit 179. Furthermore, in the receiving processing of settings information in step S30, the encryption of the received settings information is decrypted by the encryption unit 179.

<Embodiment 6>

Figure 13:
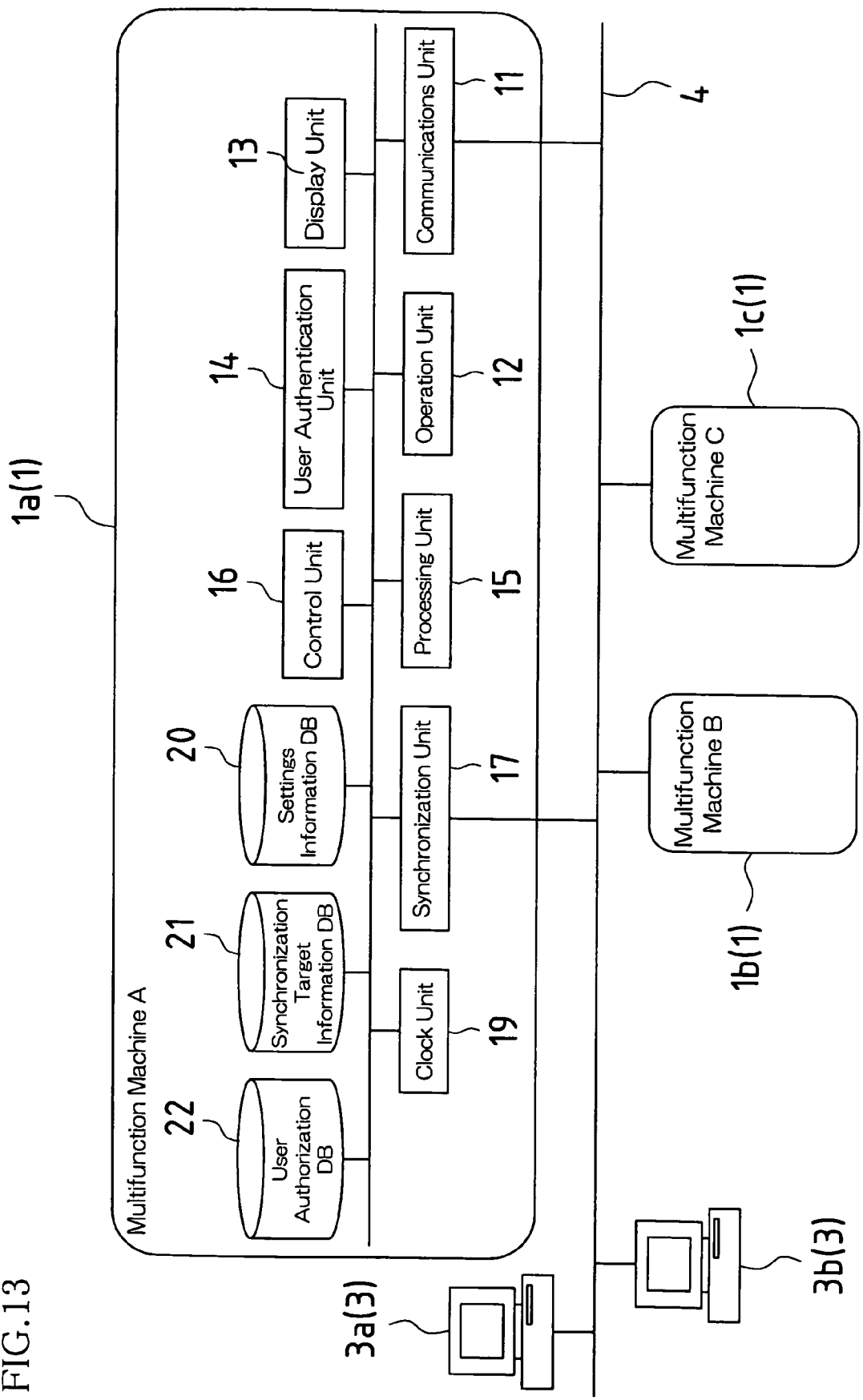
FIG. 13 is a functional block diagram illustrating the functional configuration of a synchronization system made up of multifunction machines that are connected via a network according to Embodiment 6 of the present invention.

FIG. 13 is a functional block diagram illustrating the functional configuration of a synchronization system made up of multifunction machines according to Embodiment 6 of the present invention connected via a network. In FIG. 13, the functional configurations of the multifunction machine B1b and the multifunction machine C1c are the same as that of the multifunction machine A1a, and therefore illustration thereof is omitted.

A synchronization system according to Embodiment 6 of the present invention includes, as in the case of the synchronization system according to Embodiments 1 to 5, a plurality of multifunction machines 1 (1a to 1c) provided with various functions such as printing, facsimile transmission, scanning, and copying, and a plurality of PCs 3a and 3b connected via a communications network 4.

Furthermore, in the configuration of the multifunction machine 1 according to this embodiment, a user authorization database 22 is additionally provided in the multifunction machine 1 according to Embodiments 1 to 5 (ref. FIG. 1). That is, the multifunction machine 1 is configured from a communications unit 11, an operation unit 12, a display unit 13, a user authentication unit 14, a processing unit 15, a control unit 16, a synchronization unit 17, a clock unit 19, a settings information database 20, a synchronization target information database 21, and a user authorization database 22.

The user authorization database 22 is configured as a user authorization storing means for storing user authorization information to specify users authorized to update settings information.

Therefore, in the multifunction machine 1 according to this embodiment, a user who can update the settings information stored in the settings information database 20 is limited to a user specified in user authorization information stored in the user authorization database 22.

Figure 14:
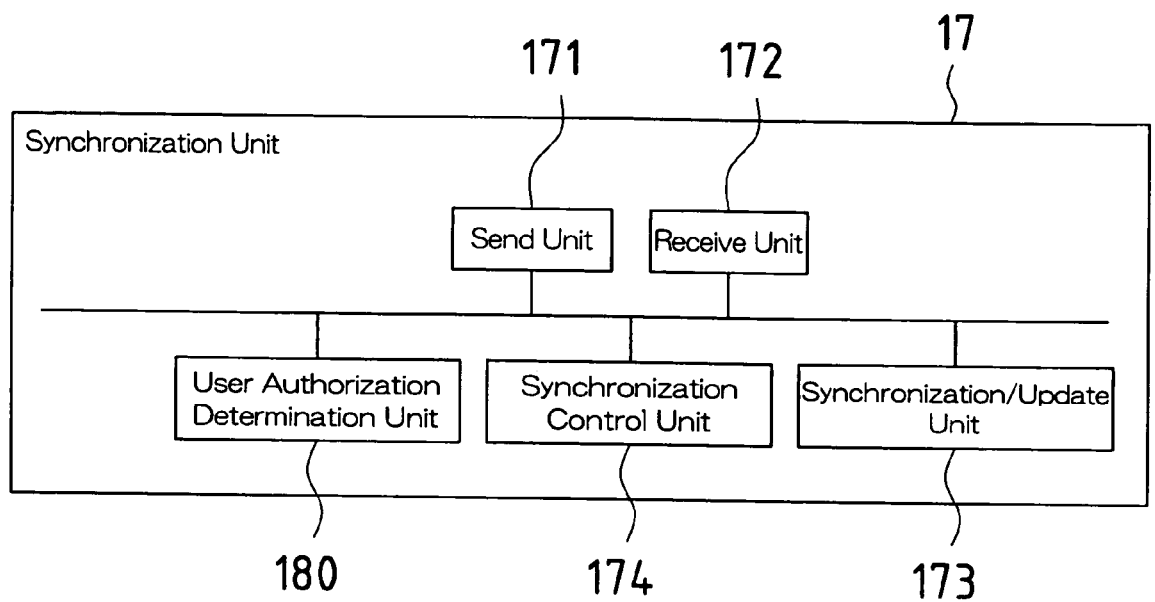
FIG. 14 is a functional block diagram specifically illustrating the functional configuration of a synchronization unit of a multifunction machine according to Embodiment 6 of the present invention.

FIG. 14 is a functional block diagram specifically illustrating the functional configuration of a synchronization unit of a multifunction machine according to Embodiment 6 of the present invention.

The synchronization unit 17 of the multifunction machine 1 according to this embodiment is configured such that a user authorization determination unit 180 is additionally provided in the synchronization unit 17 of the multifunction machine 1 according to Embodiment 1 (ref. FIG. 4). That is, in the synchronization unit 17 of the multifunction machine 1 according to this embodiment, the synchronization control unit 174 controls the send unit 171, the receive unit 172, the synchronization/update unit 173, and the user authorization determination unit 180 that constitute the synchronization unit 17 to execute the synchronization/setting processing.

The user authorization determination unit 180 is configured as a user authorization determination means for determining whether or not the user that operates the source multifunction machine 1 of the settings information is authorized to update the settings information stored in the settings information database 20 based on the user authorization information stored in the user authorization database 22.

In the following, operation of synchronization/setting processing executed by the synchronization unit 17 of the multifunction machine 1 according to this embodiment is described. In the operation of synchronization/setting processing executed in this embodiment, descriptions are omitted for operations that are the same as the operations (steps) described in Embodiments 1 to 5.

Figure 15:
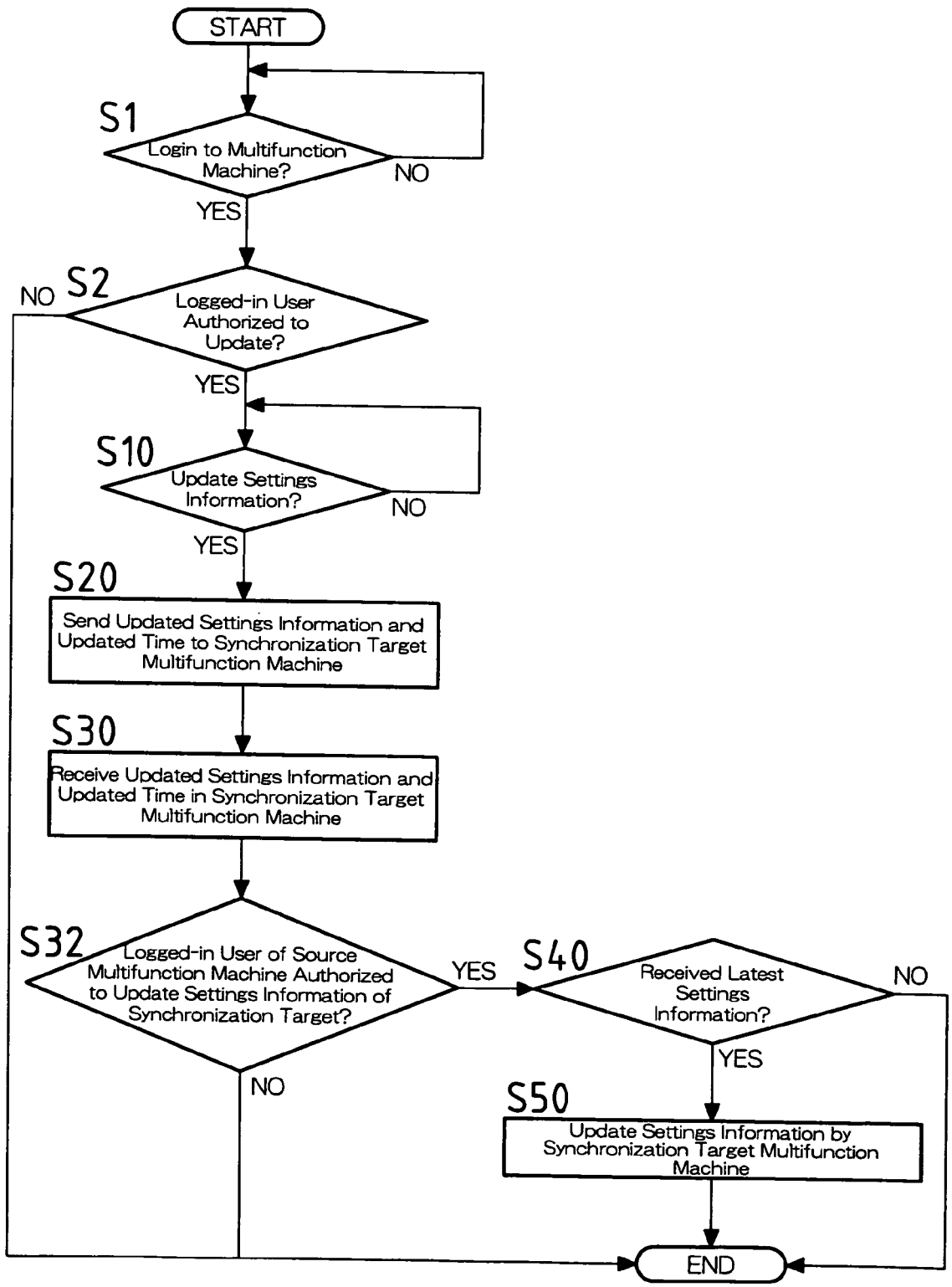
FIG. 15 is a flowchart illustrating operation of synchronization/setting processing that synchronizes settings information in a multifunction machine according to Embodiment 6 of the present invention with other multifunction machines that are connected via a network.

FIG. 15 is a flowchart illustrating operation of synchronization/setting processing that synchronizes settings information in a multifunction machine according to Embodiment 6 of the present invention with other multifunction machines that are connected via a network.

The operation of synchronization/setting processing executed in this embodiment is substantially the same as that of the operation of synchronization/setting processing in Embodiment 1 (ref. FIG. 5), but in the synchronization/setting processing executed in this embodiment, the processing in steps S1 to S2 is executed before determining whether or not the settings information is updated in step 10. That is, the synchronization/setting processing executed in this embodiment starts with step S1, in which it is determined whether or not a user logs in to the multifunction machine 1.

Step S1:

The control unit 16 determines whether or not a user logged in to the multifunction machine 1. That is, it is determined whether or not the user is authenticated by the user authentication unit 14. When it is determined that a user logged in, that is, when the user is authenticated by the user authentication unit 14, a determination of "Yes" is made, and the process moves to step S2, and when it is determined that a user is not logged in, that is, when the user is not authenticated, and this step is repeated.

Step S2:

The control unit 16 determines whether or not the user logged in to the multifunction machine 1 is authorized to update the settings information stored in the settings information database 20 based on the user authorization information stored in the user authorization database 22. When the user logged in to the multifunction machine 1 is authorized to update the settings information, a determination of "Yes" is made, and the process moves to step S10, and further, after going through step S20, the synchronization target multifunction machine 1 receives the settings information and updated time in step S30. When the user is not authorized to update the settings information, a determination of "No" is made, and the synchronization/setting processing is ended.

Furthermore, in the synchronization/setting processing executed in this embodiment, when the synchronization target multifunction machine 1 receives settings information and an updated time in step S30, the process moves to step S32.

Step S32:

The synchronization control unit 174 of the synchronization target multifunction machine 1 allows the user authorization determination unit 180 to determine whether or not the user logged in to the source multifunction machine 1 is authorized to update the settings information stored in the settings information database 20 of the synchronization target multifunction machine 1. When it is determined that the user is authorized, a determination of "Yes" is made, and the process moves to step S40, and further, the synchronization/setting processing is ended after going through step S50 according to the determination result in step S40. When it is determined that the user is not authorized, a determination of "No" is made, and the synchronization/setting processing is ended.

As in Embodiments 1 to 4, the processing in steps S30 to S50 is executed individually in the respective synchronization target multifunction machines 1 that received the settings information. That is, for example, when the send unit 171 of the multifunction machine A1a sends the updated settings information and the updated time of the settings information to the synchronization targets, i.e., the multifunction machine B1b and the multifunction machine C1c, in step S20, the processing in steps S30 to S50 is executed individually in the synchronization targets, i.e., in the multifunction machine B1b and in the multifunction machine C1c.

<Embodiment 7>

A synchronization system according to Embodiment 7 of the present invention includes, as in the case of the synchronization system according to Embodiments 1 to 6, a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment is configured to include, as in the case of the synchronization system according to Embodiment 6 (ref. FIG. 13), a communications unit 11, an operation unit 12, a display unit 13, a user authentication unit 14, a processing unit 15, a control unit 16, a synchronization unit 17, a clock unit 19, a settings information database 20, a synchronization target information database 21, and a user authorization database 22.

Figure 16:
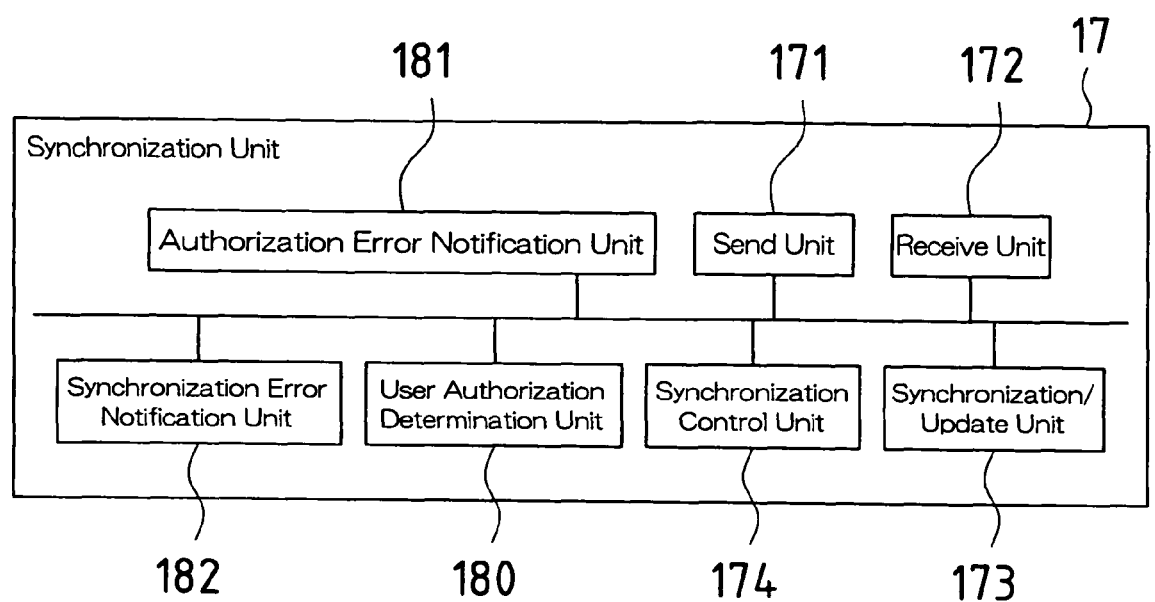
FIG. 16 is a functional block diagram specifically illustrating the functional configuration of a synchronization unit of a multifunction machine according to Embodiment 7 of the present invention.

FIG. 16 is a functional block diagram specifically illustrating the functional configuration of a synchronization unit of a multifunction machine according to Embodiment 7 of the present invention.

The synchronization unit 17 of the multifunction machine 1 in this embodiment is configured such that an authorization error notification unit 181 and a synchronization error notification unit 182 are additionally provided in the synchronization unit 17 of the multifunction machine 1 according to Embodiment 6 (ref. FIG. 14). That is, in the synchronization unit 17 of the multifunction machine 1 according to this embodiment, the synchronization control unit 174 controls the send unit 171, the receive unit 172, the synchronization/update unit 173, the user authorization determination unit 180, the authorization error notification unit 181, and the synchronization error notification unit 182 that constitute the synchronization unit 17 to execute the synchronization/setting processing.

The authorization error notification unit 181 is configured as an authorization error notification means for notifying the user that operates the source multifunction machine 1 of the settings information that there is no authorization to update the settings information of the synchronization target multifunction machine 1, that is, for notifying of an authorization error when the user authorization determination unit 180 determines that no authorization is given.

For example, the notification to the user that operates the source multifunction machine 1 of the settings information can be executed by sending an authorization error message to the source multifunction machine 1 of the settings information from the authorization error notification unit 181 of the synchronization target multifunction machine 1, and allowing the authorization error notification unit 181 of the source multifunction machine 1 of the settings information that received the message to output the received message on the display unit 13.

Or, the notification can be executed by sending an authorization error message to a PC 3 of a user that operates the source multifunction machine 1 of the settings information, and allowing the PC 3 that received the message to display the received message on the screen of the PC 3.

The synchronization error notification unit 182 is configured as a synchronization error notification means for notifying the user that operates the source multifunction machine 1 of the settings information of a synchronization error when the settings information is not updated properly by the synchronization/update unit 173.

The notification to the user that operates the source multifunction machine 1 can also be executed by sending a synchronization error message to the source multifunction machine 1 of the settings information from the synchronization error notification unit 182 of the synchronization target, and allowing the synchronization error notification unit 182 of the source multifunction machine 1 of the settings information that received the message to output the received synchronization error message to the display unit 13.

Or, the notification can be executed by sending the synchronization error message to the PC 3 of the user that operates the source multifunction machine 1 of the settings information, and allowing the PC 3 that received the message to display the received synchronization error message on the screen of the PC 3.

In the following, operation of synchronization/setting processing executed by the synchronization unit 17 of the multifunction machine 1 according to this embodiment is described. In the operation of synchronization/setting processing executed in this embodiment, descriptions are omitted for operations that are the same as the operations (steps) described in Embodiments 1 to 6.

Figure 17:
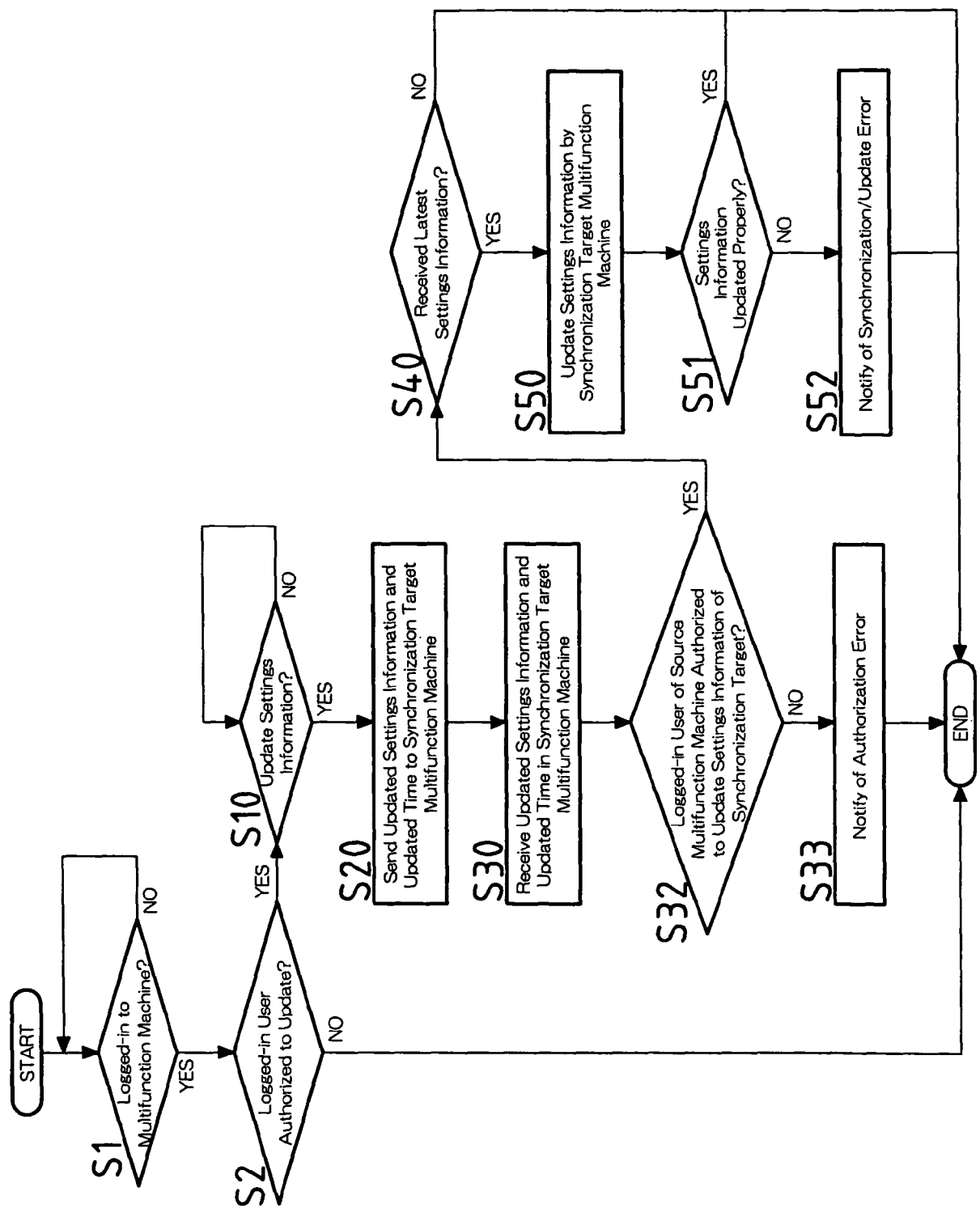
FIG. 17 is a flowchart illustrating operation of synchronization/setting processing that synchronizes settings information in a multifunction machine according to Embodiment 7 of the present invention with other multifunction machines that are connected via a network.

FIG. 17 is a flowchart illustrating operation of synchronization/setting processing that synchronizes settings information in a multifunction machine according to Embodiment 7 of the present invention with other multifunction machines that are connected via a network.

The operation of synchronization/setting processing executed in this embodiment is substantially the same as the operation of synchronization/setting processing in Embodiment 6 (ref. FIG. 15), but when a determination of "No" is made in step 32, the process moves to step S33.

Step S33:

The synchronization control unit 174 of the synchronization target multifunction machine 1 allows the authorization error notification unit 181 to execute processing in which notification indicating that there is no authorization to update the settings information of the synchronization target multifunction machine 1 is given to the user that operates the source multifunction machine 1 of the settings information, and the synchronization/setting processing is ended.

When a determination of "Yes" is made in step S32, as in the case of the synchronization/setting processing executed in Embodiment 6, the process moves to step S40, and the process moves to step S50 according to the determination result of step S40. After updating the settings information in step S50, the process moves to step S51.

Step S51:

The synchronization control unit 174 of the synchronization target multifunction machine 1 determines whether or not the settings information stored in the settings information database 20 is properly updated in the processing in step S50. When the settings information is properly updated, a determination of "Yes" is made, and the synchronization/setting processing is ended. When the settings information is not properly updated, a determination of "No" is made, and the process moves to step S52. The case when the settings information database 20 is not properly updated refers to, for example, the case when the settings information of the settings information database 20 cannot be updated owing to causes such as a "down" state of the machine from turning off its power, a network failure, and a memory writing error due to component failure.

Step S52:

The synchronization control unit 174 of the synchronization target multifunction machine 1 allows the synchronization error notification unit 182 to execute processing in which the user that operates the source multifunction machine 1 of the settings information is notified of the synchronization error.

As in Embodiments 1 to 6, the processing in steps S30 to S50 is executed individually in the respective synchronization target multifunction machines 1 that received the settings information. That is, for example, when the send unit 171 of the multifunction machine A1a sends the updated settings information and the updated time of the settings information to the synchronization targets, i.e., the multifunction machine B1b and the multifunction machine C1c, in step S20, the processing in steps S30 to S50 is executed individually in the synchronization targets, i.e., in the multifunction machine B1b and in the multifunction machine C1c.

<Embodiment 8>

A synchronization system according to this embodiment of the present invention is configured to include, as in the case of the synchronization system according to Embodiments 1 to 7, a plurality of multifunction machines 1 (1a to 1c) provided with various functions such as printing, facsimile transmission, scanning, and copying, and a plurality of PCs 3a and 3b connected via a communications network 4.

Furthermore, the multifunction machine 1 according to this embodiment of the present invention is configured such that an import unit (not shown) is further provided in the configuration of the multifunction machine 1 of any one of Embodiments 1 to 8. The import unit is configured to search for other multifunction machines 1 connected via the network 4, and import the settings information and the synchronization target information of the multifunction machine 1 that was retrieved to the settings information database 20 and the synchronization target information database 21.

That is, the synchronization system according to this embodiment is configured such that the settings information 201 and the synchronization target information 210 of other multifunction machine 1 connected via the network 4 can be automatically stored in settings information database 20 and synchronization target information database 21 of a newly connected multifunction machine 1, when a new multifunction machine 1 is added and connected to the network 4.

Furthermore, the multifunction machine 1 according to this embodiment of the present invention is configured such that the settings information includes operational settings information relating to operational setting of various functions for respective users.

FIG. 18 is a diagram illustrating an example of contents stored in a settings information database of a multifunction machine according to Embodiment 8 of the present invention.

The settings information database 20 stores the settings information 201 along with an updated time 203 of the settings information. The settings information 201 is configured to include use restriction settings information 202, and operational settings information 204 relating to operational setting of various functions for respective users.

The use restriction settings information 202 indicates, as described in Embodiment 1, whether or not the respective users (user a, user b, and so on) can make use of (permitted, not permitted) the various functions (copying, scanning, facsimile transmission, and printing) provided in the multifunction machine 1.

The operational settings information 204 indicates, for respective users (user a, user b, and so on), operational setting that are frequently used by a user at the time of printing (print setting: setting P1, setting P2, and so on (for example, settings for resolution, trimming, and the number of pages per a sheet of paper)); operational setting frequently used by a user at the time of facsimile transmission (facsimile setting: setting F1, setting F2, and so on (for example, settings for resolution, trimming, and the number of pages per a sheet of paper)); operational setting frequently used by a user at the time of scanner setting (scanner setting: setting S1, setting S2, and so on (for example, settings for resolution, and destination)); and operational setting frequently used by a user at the time of copying (copy setting: setting C1, setting C2, and so on (for example, settings for resolution, trimming, number of pages per a sheet of paper)).

The operational setting includes settings relating to various operations, for example, settings for operational buttons disposed on the operational panel, in addition to resolution, trimming, number of pages per a sheet of paper, and destination for scanning. Operability improves by storing such settings for respective users. Although the operational settings information 204 shows operational settings by various functions (copying, scanning, and facsimile transmission) (print setting: setting P1, setting P2, and so on; facsimile setting: setting F1, setting F2, and so on; scanner setting: setting S1, setting S2, and so on; and copy setting: setting C1, setting C2, and so on) in this embodiment, the operational settings information is not limited thereto, and settings relating to operations can be shown by various operations (for example, setting for disposition of operational button, resolution setting, and destination setting).

By storing such operational settings information 204 in the settings information database 20, when the processing unit 15 carries out various processing (printing, facsimile transmission, scanning, and copying), appropriate operational setting suitable for a user authenticated by the user authentication unit 14 can be extracted from the settings information database 20 and shown by default on the display unit 13, or on a screen of the PC3 used by the user via the communications unit 11. That is, the operational setting frequently used by the user can be fetched and shown to the user.

Thus, because the multifunction machine 1 according to this embodiment includes operational settings information in addition to the use restriction settings information in the settings information, other multifunction machines 1 connected via the network 4 can be synchronized and set for the operational settings information, in addition to the use restriction settings information.

Furthermore, the settings information indicates a group (accounting section, development section, and production group) for respective users (user a, user b, and so on).

Furthermore, in the multifunction machine 1 according to this embodiment, the settings information stored in the settings information database 20 is configured such that the updating can be executed by the group, not only by the user. To be specific, for example, the configuration is made such that the settings information stored in the settings information database 20 can be updated only for the settings information of users belonging to a specific group specified through the operation unit 12 or the communications unit 11.

Furthermore, the send unit 171 is configured such that the settings information can be sent by the group in addition to by the user. To be specific, the configuration is made such that in the settings information of respective users stored in the settings information database 20, only the settings information of users belonging to the group whose settings information is updated can be sent.

Furthermore, the synchronization/update unit 173 is configured such that the settings information stored in the settings information database 20 can be updated by the group, in addition to by the user, according to the settings information received in the receive unit 172. To be specific, the configuration is made such that the settings information stored in the settings information database 20 can be updated only for the settings information of users belonging to a specific group received by the receive unit 172.

The present invention may be embodied in other forms without departing from the spirit or essential characteristics thereof The embodiments disclosed in this application are to be considered in all respects as illustrative and not limiting. The scope of the invention is indicated by the appended claims and is not bound to the foregoing description, and all changes which come within the meaning and range of equivalency of the claims are intended to be embraced therein.

The invention claimed is:

1. A multifunction machine in which settings information including use restriction settings information that indicates use restriction settings of various functions for individual users is set in synchronization with other multifunction machines that are connected via a network, the multifunction machine comprising:

a clock means for recognizing time;

a settings information storing means that stores settings information and an updated time recognized by the clock means when the settings information is updated;

a synchronization target information storing means that stores synchronization target information that specifies synchronization target multifunction machines whose settings information is to be synchronized;

a sending means that sends updated settings information and the updated time of the settings information to the synchronization target multifunction machines specified by the synchronization target information stored in the synchronization target information storing means when the settings information stored in the settings information storing means is updated by a user's operation;

a receiving means that receives the settings information and the updated time of the settings information sent from the other multifunction machines; and a synchronization/update means that updates the settings information stored in the settings information storing means based on the received settings information when the updated time received by the receiving means is later than the updated time stored in the settings information storing means.

2. The multifunction machine according to claim 1, further comprising:

a synchronization requesting means that, when the settings information stored in the settings information storing means is updated by a user's operation, sends a synchronization request to the synchronization target multifunction machines specified by the synchronization target information stored in the synchronization target information storing means; and a synchronization responding means that responds to the synchronization request sent by the synchronization requesting means of the other multifunction machines, wherein the sending means sends updated settings information and an updated time of the settings information to the synchronization target multifunction machines when the synchronization target multifunction machines can be synchronized based on the response from the synchronization responding means of the synchronization target multifunction machines.

3. The multifunction machine according to claim 2, further comprising a notification/selection means that, when there is no response to the synchronization request from the synchronization target multifunction machines to which the synchronization request is issued by the synchronization requesting means, or when there is a response indicating that synchronization cannot be executed from the synchronization target multifunction machines, notifies a user that the synchronization target multifunction machines cannot be synchronized, and allows the user to select whether or not a synchronization request is issued again.

4. The multifunction machine according to claim 1, wherein the settings information includes operational settings information relating to operational settings of various functions for respective users.

5. The multifunction machine according to claim 1, further comprising a user authorization storing means that stores user authorization information for specifying a user who has authorization to update the settings information, wherein a user who can update the settings information stored in the settings information storing means is limited to a user specified by the user authorization information stored in the user authorization storing means.

6. The multifunction machine according to claim 5, further comprising a user authorization determination means that determines whether or not a user that operates a source multifunction machine of settings information has authorization to update the settings information of the settings information storing means based on the user authorization information stored in the user authorization storing means, wherein the synchronization/update means updates the settings information stored in the settings information storing means according to the settings information received by the receiving means only when the user authorization determination means determined that the user has the authorization.

7. The multifunction machine according to claim 6, further comprising an authorization error notification means that, when the user authorization determination means determines that there is no authorization, notifies the user that operates the source multifunction machine of settings information that there is no authorization to update the settings information of the synchronization target multifunction machines.

8. The multifunction machine according to claim 1, further comprising a synchronization error notification means that notifies the user that operates the source multifunction machine of settings information of a synchronization error when the settings information is not updated properly by the synchronization/update means.

9. The multifunction machine according to claim 1, further comprising a time synchronization means that synchronizes time recognized by the clock means with the time of the source multifunction machine of settings information when the receiving means receives settings information.

10. The multifunction machine according to claim 1, further comprising an encryption means that encrypts communication between a plurality of multifunction machines that are connected via a network, wherein the sending means sends encrypted settings information, and the receiving means receives encrypted settings information.

11. The multifunction machine according to claim 1, wherein the settings information stored in the settings information storing means is updated in user units or user group units, the sending means sends the settings information in the user units or the user group units, and the synchronization/update means updates the settings information stored in the settings information storing means in the user units or the user group units according to the settings information received by the receiving means.

12. The multifunction machine according to claim 1, further comprising an importing means that searches for another multifunction machine connected to a network, and imports settings information and synchronization target information of the retrieved multifunction machine to the settings information storing means and the synchronization target information storing means, respectively.

13. A synchronization system, comprising two or more multifunction machines according to claim 1.

* * * * *